US012640805B2

(12) United States Patent
Ives et al.

(10) Patent No.: US 12,640,805 B2
(45) Date of Patent: May 26, 2026

(54) ENABLEMENT OF ELECTRONIC DEVICE APPLICATIONS IN SATELLITE COMMUNICATION MODE

(71) Applicant: T-Mobile USA, Inc., Bellevue, WA (US)

(72) Inventors: Derrick L. Ives, North Bend, WA (US); Ryan P. Dreiling, Shawnee, KS (US); Thomas P. Lucht, Seattle, WA (US); Helen Wang, Bellevue, WA (US); Michele Lundahl, Bellevue, WA (US); Mehul Shah, Bellevue, WA (US); Zaheer Mohammed Siddique, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/400,977

(22) Filed: Dec. 29, 2023

(65) Prior Publication Data

US 2025/0219714 A1 Jul. 3, 2025

(51) Int. Cl.
*H04B 7/185* (2006.01)

(52) U.S. Cl.
CPC ................................. *H04B 7/18513* (2013.01)

(58) Field of Classification Search
CPC ............ H04B 7/18513; H04B 7/18515; H04B 10/118; H04B 7/18541; H04W 36/302;
(Continued)

(56) References Cited

U.S. PATENT DOCUMENTS 9,158,523 B2 10/2015 Leermakers
11,082,973 B2 8/2021 Wang et al.
(Continued)

FOREIGN PATENT DOCUMENTS

CN 116647888 A 8/2023
EP 3143804 B1 2/2018
(Continued)

OTHER PUBLICATIONS

International Search Report and Written Opinion from PCT App. No. PCT/US2024/062055 mailed Apr. 17, 2025, 12 pages.
(Continued)

*Primary Examiner* — Fred A Casca
(74) *Attorney, Agent, or Firm* — Perkins Coie LLP

(57) ABSTRACT

A mobile device having multiple applications installed determines that a first communication network associated with a mobile network operator of the mobile device is unavailable. The device receives network information from a second communication network indicating that the second communication network is available. In response to determining that the second communication network is available, the device connects to the second communication network. The device determines, based on the network information, that the second communication network is a non-terrestrial communication network. The second communication network is associated with a bandwidth less than a threshold bandwidth. In response to determining that the second communication network is a non-terrestrial communication network, the mobile device is configured to operate in a non-terrestrial mode. At least one application is rendered inoperable while the mobile device is operating in the non-terrestrial mode. The application requires at least the threshold bandwidth to operate.

18 Claims, 13 Drawing Sheets

(58) Field of Classification Search
CPC ............. H04W 36/249; H04W 36/283; H04W 36/0061; H04W 36/08; H04W 36/083; H04W 36/32; H04W 60/00
See application file for complete search history.

(56) References Cited

U.S. PATENT DOCUMENTS

| | | | |
|---|---|---|---|
| 11,171,719 B2 | 11/2021 | Cui et al. | |
| 2004/0202246 A1 | 10/2004 | Watanabe et al. | |
| 2013/0242942 A1* | 9/2013 | Stille | H04L 65/1083 |
| | | | 370/331 |
| 2015/0261423 A1* | 9/2015 | Beaumont | G06F 9/451 |
| | | | 715/778 |
| 2016/0080828 A1 | 3/2016 | Roul et al. | |
| 2016/0337883 A1 | 11/2016 | Raleigh et al. | |
| 2016/0381657 A1* | 12/2016 | Blanchard | H04W 8/183 |
| | | | 455/427 |
| 2018/0007435 A1* | 1/2018 | Beattie, Jr. | H04N 21/6125 |
| 2021/0068013 A1 | 3/2021 | Cheng | |
| 2021/0092657 A1 | 3/2021 | Kanagarathinam et al. | |
| 2021/0242935 A1 | 8/2021 | Sakhnini et al. | |
| 2021/0297923 A1 | 9/2021 | Wei et al. | |
| 2021/0359752 A1 | 11/2021 | Wang et al. | |
| 2021/0367661 A1 | 11/2021 | Ravishankar et al. | |
| 2021/0367663 A1 | 11/2021 | Ravishankar et al. | |
| 2021/0385675 A1 | 12/2021 | Määttänen et al. | |
| 2022/0007323 A1 | 1/2022 | Li et al. | |
| 2022/0030511 A1 | 1/2022 | Wang et al. | |
| 2022/0039033 A1 | 2/2022 | Sengupta et al. | |
| 2022/0085874 A1 | 3/2022 | Shrestha et al. | |
| 2022/0109496 A1 | 4/2022 | Shrestha et al. | |
| 2022/0256631 A1* | 8/2022 | Jain | H04W 76/15 |
| 2022/0303331 A1 | 9/2022 | Svennebring et al. | |
| 2023/0319661 A1 | 10/2023 | Mttnen et al. | |
| 2023/0328171 A1 | 10/2023 | Caro et al. | |
| 2023/0379811 A1 | 11/2023 | Niemi et al. | |
| 2023/0410167 A1 | 12/2023 | Heron et al. | |
| 2024/0073928 A1 | 2/2024 | Yu et al. | |
| 2024/0389178 A1 | 11/2024 | Zia et al. | |

FOREIGN PATENT DOCUMENTS

| | | |
|---|---|---|
| WO | 2019221503 A1 | 11/2019 |
| WO | 2022156953 A1 | 7/2022 |

OTHER PUBLICATIONS

International Search Report and Written Opinion from PCT App. No. PCT/US2024/062185 mailed Apr. 17, 2025, 9 pages.
Apple, "NTN-TN cell reselection enhancement", R2-2306153 Section 2.3, 3GPP TSG RAN WG2 Meeting #122, May 12, 2023, 8 pages.
International Search Report and Written Opinion from PCT App. No. PCT/US2024/062181 mailed Apr. 21, 2025, 13 pages.

* cited by examiner

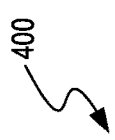

400

| Mobile Country Code (MCC) 402 | Mobile Network Code (MNC) 404 | Network Type 406 | Device Settings 408 |
|---|---|---|---|
| Germany (262) | T-Mobile (01) | Terrestrial Network (LTE) | Message/Voice Call: Enabled<br>Data Services: Enabled<br>Characteristic: LTE Icon |
| United States (310) | T-Mobile (660) | Terrestrial Network (5G) | Message/Voice Call: Enabled<br>Data Services: Enabled<br>Characteristic: 5G Icon |
| United States (312) | T-Mobile (190) | Non-Terrestrial Network | Message/Voice Call: Message only<br>Data Services: Disabled<br>Characteristic: Satellite Icon |
| International Networks (901) | Satellite Wireless (35) | Non-Terrestrial Network | Message/Voice Call: Enabled<br>Data Services: Disabled<br>Characteristic: Satellite Sound |

*FIG. 4*

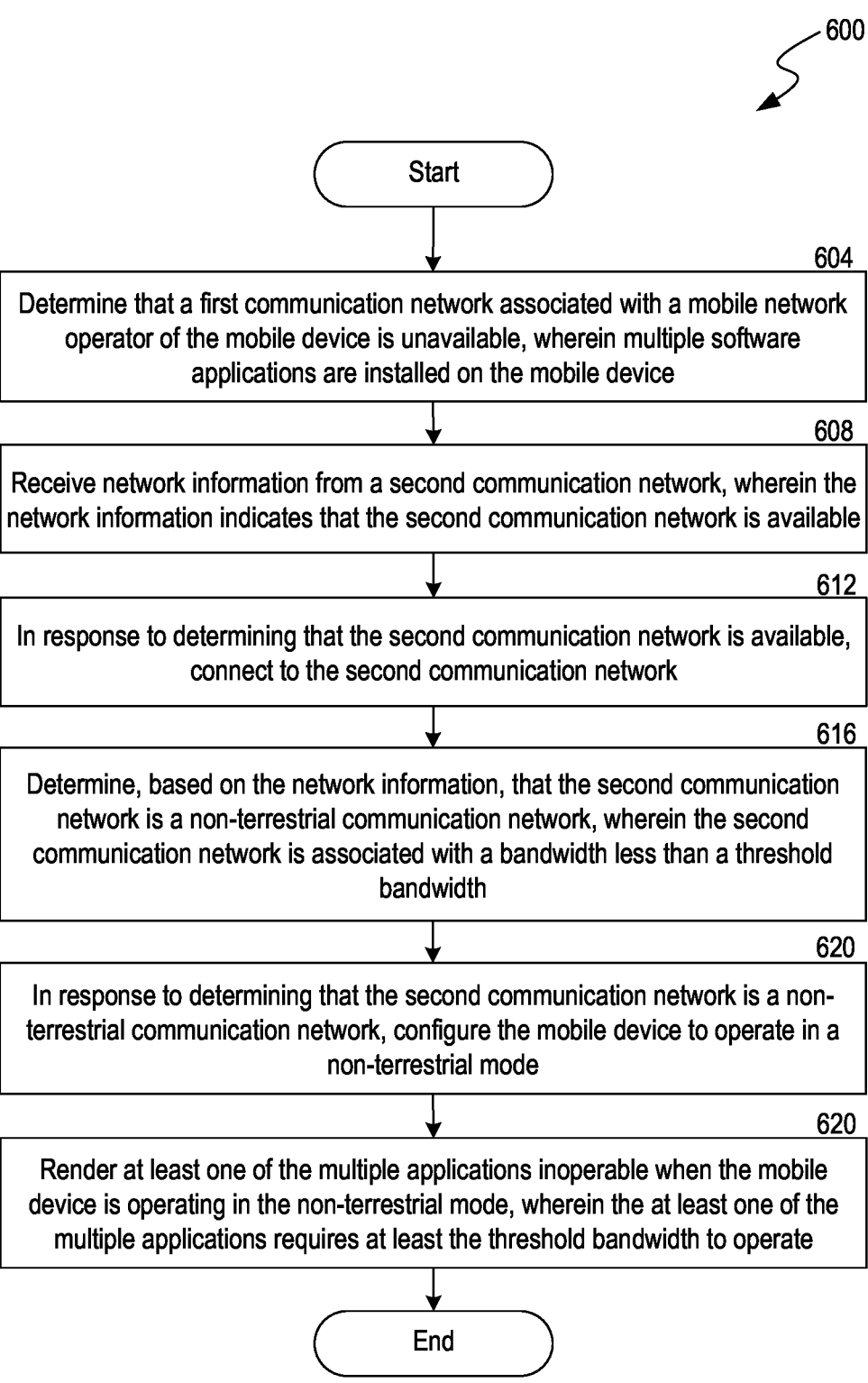

600

Start

604

Determine that a first communication network associated with a mobile network operator of the mobile device is unavailable, wherein multiple software applications are installed on the mobile device

608

Receive network information from a second communication network, wherein the network information indicates that the second communication network is available

612

In response to determining that the second communication network is available, connect to the second communication network

616

Determine, based on the network information, that the second communication network is a non-terrestrial communication network, wherein the second communication network is associated with a bandwidth less than a threshold bandwidth

620

In response to determining that the second communication network is a non-terrestrial communication network, configure the mobile device to operate in a non-terrestrial mode

620

Render at least one of the multiple applications inoperable when the mobile device is operating in the non-terrestrial mode, wherein the at least one of the multiple applications requires at least the threshold bandwidth to operate End

*FIG. 6*

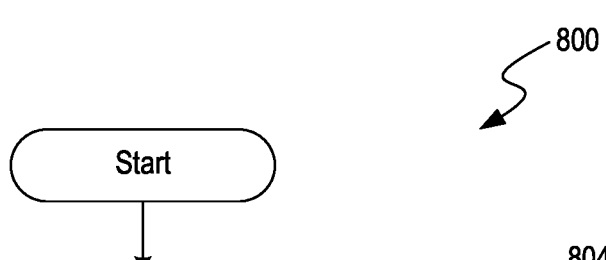

```
                            Start

804
  Receive network information including at least one Public Land Mobile Network
  (PLMN) code from a non-terrestrial communication network to which the mobile
   device is connected, wherein a streaming application installed on the mobile
   device is configured to stream data at a first bit rate when the mobile device is
                connected to a terrestrial communication network 808
  Determine, based on the at least one PLMN code, at least one available network
  resource of the non-terrestrial communication network, wherein the at least one
    available network resource comprises a bandwidth, a latency, and/or a data
          packet loss rate of the non-terrestrial communication network 812
   Configure, in accordance with the at least one available network resource, the
   streaming application to stream data at a second bit rate lower than the first bit
   rate while the mobile device is connected to the non-terrestrial communication
   network, wherein the streaming application is configured in accordance with a
    quality of service provided by the non-terrestrial communication network, and
  wherein the quality of service is based on a frequency range of the non-terrestrial
    communication network, a congestion level of the non-terrestrial communication
    network, and/or a signal strength of the non-terrestrial communication network
```

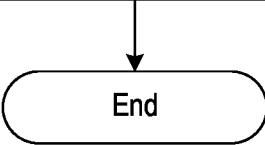

End

FIG. 8

ENABLEMENT OF ELECTRONIC DEVICE APPLICATIONS IN SATELLITE COMMUNICATION MODE

BACKGROUND

Current wireless communications systems (e.g., fifth-generation mobile network (5G)) utilize base stations to communicate with user equipment. Base stations can be located at the surface of the Earth, and support telecommunications coverage in a surrounding area. When in a coverage region of the base station, a user equipment can connect with the base station to communicate data through the network. In contrast to 5G, the sixth-generation mobile system standard (6G) enables user equipment to communicate directly with an orbiting satellite. The user equipment can connect to a satellite when within a coverage region of the satellite. In general, a satellite can provide a larger coverage region and can more easily provide coverage to remote locations. Accordingly, network providers are utilizing non-terrestrial networks to increase coverage and provide improved networks.

BRIEF DESCRIPTION OF THE DRAWINGS

Detailed descriptions of implementations of the present technology will be described and explained through the use of the accompanying drawings.

FIG. 4 is a table that illustrates device configuration data in accordance with aspects of the present technology.

FIG. 6 is a flow diagram that illustrates an example process in accordance with aspects of the present technology.

FIG. 8 is a flow diagram that illustrates an example process in accordance with aspects of the present technology.

Figure 1:
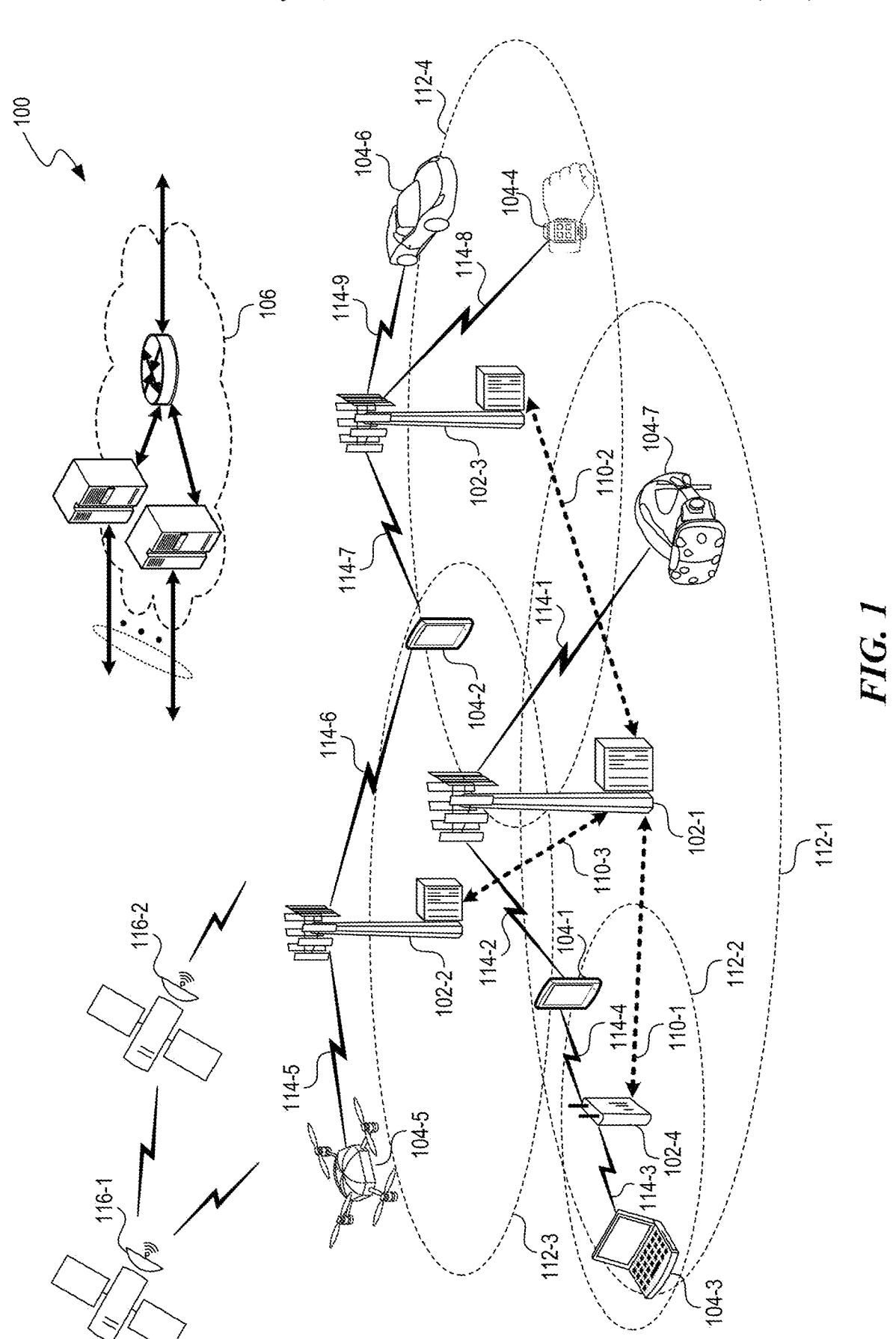
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

New generations of wireless telecommunication networks, such as 6G, utilize satellites to improve network coverage. Given that satellites are not bound to the surface of the Earth, satellites can provide a larger coverage region than base stations and more easily provide coverage in remote locations. As a consequence of this increased coverage region, a greater number of users may compete for communication resources provided by the satellite networks, thereby increasing congestion. This congestion can be worsened by the limited wireless resources that are provided by these networks. For example, satellite networks can be difficult or costly to implement, resulting in these networks having decreased bandwidths or greater latency. Thus, satellite networks can be resource-constrained due to increased competition for limited communication resources.

Given that satellite networks and terrestrial networks have different capabilities, particular different device settings can enable wireless devices to function more efficiently on different networks. For example, satellite networks can be more resource-constrained than terrestrial networks implemented through surface-bound base stations. Mobile network providers can choose to disable some wireless services on satellite networks. For example, mobile network providers may choose to disable message, voice call, or data services on satellite networks. To reduce congestion caused by wireless devices transmitting service requests for wireless services that are not provided by a satellite network, mobile network providers can disable a wireless device from requesting these services while connected to a satellite network. Moreover, given the difference in capabilities of the network, a user of the wireless device can benefit from being informed that they have connected to a wireless network. To accomplish this, the mobile network provider can cause the wireless device to provide an indication of a connection to a satellite network while connected to a satellite network. The indication of the connection to the satellite network can be provided through visual, auditory, or haptic feedback.

Mobile network providers can disable a wireless device from requesting one or more wireless services, and cause the wireless device to provide the indication of the connection to the satellite network by dictating device settings with which the wireless device is to comply while connected to a particular network. For example, the wireless device can maintain device configuration data that can be used to determine device settings associated with different networks. The device configuration data can associate different device settings with different entries of network information indicative of the different networks.

Device settings can be determined using information that is broadcast by available networks that have a coverage area that encompasses the location of a wireless device. For example, networks can broadcast an associated public land mobile network (PLMN) code, including a Mobile Country Code (MCC) and Mobile Network Code (MNC), within system information blocks. The wireless device can receive the system information blocks and determine if the wireless device is to comply with certain device settings while connected to a network associated with the PLMN code. In some cases, the wireless device is to comply with certain device settings only when the network is of a particular type. For example, the wireless device can determine the appropriate device settings associated with a network when the network is determined to be a satellite network.

Alternatively or additionally, the wireless device is to comply with certain device settings only when the network is associated with a particular network provider. For example, a network provider can provide device settings for different networks associated with the particular network provider. A satellite network partnered with a terrestrial network provider can be allocated a PLMN code belonging to the terrestrial network provider rather than provisioning an entirely new PLMN code to the satellite network. As discussed above, satellite networks can have different capabilities than terrestrial networks. Thus, the terrestrial network provider can benefit from specifying different device settings associated with different networks having PLMN codes belonging to the terrestrial network provider. Given that the device settings are associated with networks having PLMN codes belonging to the terrestrial network provider, in some cases, the device settings can be determined in response to the determination that a wireless device is to connect with a mobile network having a PLMN code belonging to the terrestrial network provider.

This document discloses methods, systems, and apparatuses for enablement of electronic device applications in satellite communication mode. In some implementations, a mobile device includes at least one hardware processor and at least one non-transitory computer-readable storage medium storing instructions. The instructions can be executed by the hardware processor to cause the mobile device to determine that a first communication network associated with a mobile network operator of the mobile device is unavailable. Multiple software applications are installed on the mobile device. The mobile device receives network information from a second communication network. The network information indicates that the second communication network is available. In response to determining that the second communication network is available, the mobile device connects to the second communication network. The mobile device determines, based on the network information, that the second communication network is a non-terrestrial communication network. The second communication network is associated with a bandwidth less than a threshold bandwidth. In response to determining that the second communication network is a non-terrestrial communication network, the mobile device is configured to operate in a non-terrestrial mode. The mobile device renders at least one of the multiple software applications (which requires at least the threshold bandwidth to operate) inoperable while the mobile device is operating in the non-terrestrial mode.

In some implementations, a mobile device receives network information including at least one PLMN code from a non-terrestrial communication network to which the mobile device is connected. A streaming application installed on the mobile device is configured to stream data at a first bit rate while the mobile device is connected to a terrestrial communication network. The mobile device determines, based on the PLMN code, at least one available network resource of the non-terrestrial communication network. The available network resource includes a bandwidth, a latency, and/or a data packet loss rate of the non-terrestrial communication network. The mobile device configures, in accordance with the available network resource, the streaming application to stream data at a second bit rate lower than the first bit rate while the mobile device is connected to the non-terrestrial communication network. The streaming application is configured in accordance with a quality of service provided by the non-terrestrial communication network. The quality of service is based on a frequency range of the non-terrestrial communication network, a congestion level of the non-terrestrial communication network, and/or a signal strength of the non-terrestrial communication network.

In some implementations, a mobile app store receives an access request for access to the mobile app store. The request is from a mobile device connected to a communication network. The mobile app store includes multiple first versions of software applications configured for use on terrestrial networks, and corresponding multiple second versions of the software applications configured for use on non-terrestrial networks. The mobile app store determines that the communication network is a non-terrestrial network based on information sent from the mobile device via the communication network. In response to determining that the communication network is a non-terrestrial network, the mobile app store enables display of only the multiple second versions of the software applications on an electronic display of the mobile device, while preventing display of the multiple first versions of the software applications on the mobile device. The mobile app store receives a request from the mobile device for downloading a particular one of the multiple second versions of the software applications from the mobile app store. In response to receiving the download request, the mobile app store pushes the particular one of the multiple second versions of the software applications to the mobile device for installation of the particular one of the multiple second versions of the software applications by the mobile device.

The benefits and advantages of the implementations described herein include the use of the device configuration data to configure a wireless device to comply with particular device settings while connected to a network with which the particular device settings are associated. In doing so, the wireless device can be configured in accordance with device settings that allow the wireless device to communicate with a particular network with improved performance. The ability to configure the wireless device in accordance with specific device settings tuned to improve performance on a specific network can be particularly beneficial for satellite networks, which can have constrained network resources and greater restrictions. The implementations disclosed herein avoid strain on resource-constrained non-terrestrial networks, reduce the amount of data downloaded/uploaded and transported, as well as reduce electrical power consumption by satellites and user devices.

The methods disclosed herein cause a reduction in greenhouse gas emissions compared to traditional methods for operating telecommunication networks. Every year, approximately 40 billion tons of $CO^2$ are emitted around the world. Power consumption by digital technologies including telecommunications networks account for approximately 4% of this figure. Further, conventional user device and application settings can sometimes exacerbate the causes of climate change. For example, the average U.S. power plant expends approximately 600 grams of carbon dioxide for every kWh generated. The implementations disclosed herein for conserving network resources can mitigate climate change by reducing and/or preventing additional greenhouse gas emissions into the atmosphere. For example, disabling applications on mobile devices while connected to satellite networks to avoid unnecessary data communication as described herein reduces electrical power consumption and the amount of data downloaded/uploaded compared to traditional methods for operating apps. In particular, by tuning device settings to improve performance on specific networks, the disclosed systems provide increased efficiency compared to traditional methods.

Moreover, in the U.S., datacenters are responsible for approximately 2% of the country's electricity use, while globally they account for approximately 200 terawatt Hours (TWh). Transferring 1 GB of data can produce approximately 3 kg of $CO^2$. Each GB of data downloaded thus results in approximately 3 kg of $CO^2$ emissions or other greenhouse gas emissions. The storage of 100 GB of data in the cloud every year produces approximately 0.2 tons of $CO^2$ or other greenhouse gas emissions. Disabling message, voice call, or data services on satellite networks according to the embodiments disclosed herein reduces the amount of data downloaded, and obviates the need for wasteful $CO^2$ emissions. Therefore, the disclosed implementations for reconfiguring wireless devices for operation on satellite networks mitigates climate change and the effects of climate change by reducing the amount of data stored and downloaded in comparison to conventional network technologies.

The description and associated drawings are illustrative examples and are not to be construed as limiting. This disclosure provides certain details for a thorough understanding and enabling description of these examples. One skilled in the relevant technology will understand, however, that the embodiments can be practiced without many of these details. Likewise, one skilled in the relevant technology will understand that the embodiments can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
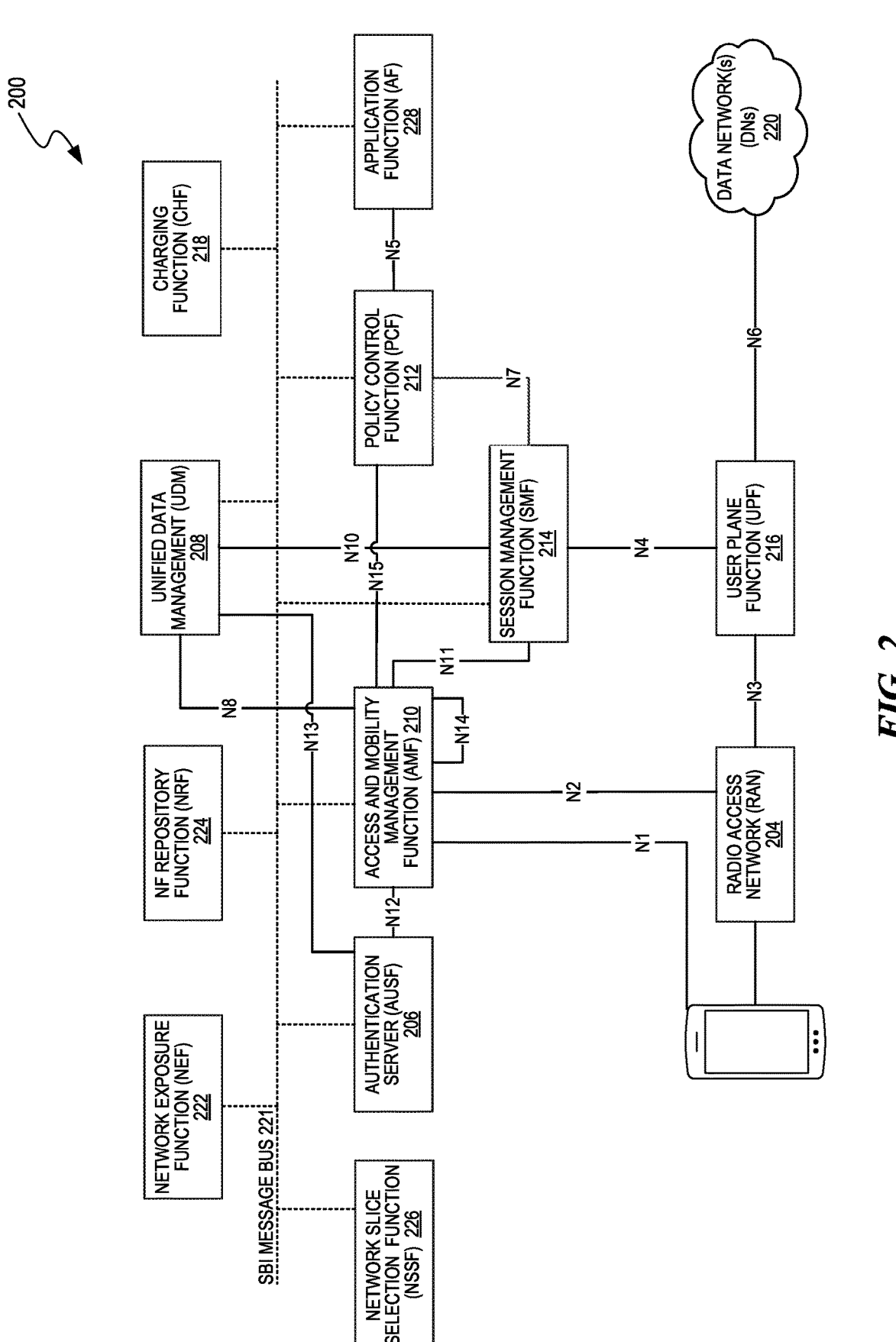
FIG. 2 is a block diagram that illustrates an architecture including 5G Core network functions that can implement aspects of the present technology.

FIG. 2 is a block diagram that illustrates an architecture 200 including 5G Core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Electronic Device Applications in Satellite Communication Mode

Figure 3:
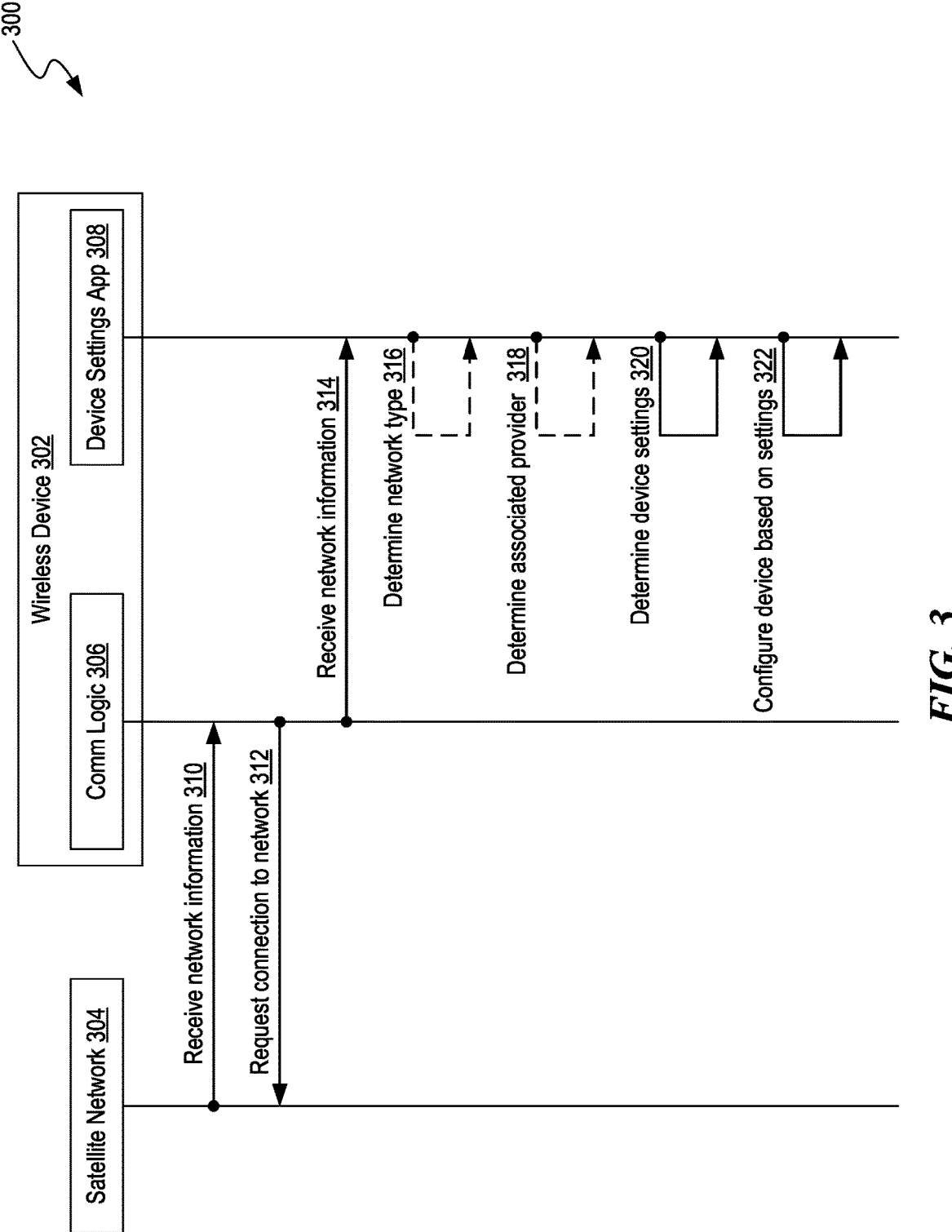
FIG. 3 is a drawing that illustrates a method for configuring device settings when connected to a satellite network in accordance with aspects of the present technology.

FIG. 3 is a drawing that illustrates a method 300 for configuring device settings while connected to a satellite network 304 in accordance with aspects of the present technology. The satellite network 304 and wireless device 302 are implemented using components of the example computer system 1100 illustrated and described in more detail with reference to FIG. 11. For example, the wireless device 302 can be implemented using processor 1102 and instructions 1108 programmed in the memory 1106 illustrated and described in more detail with reference to FIG. 11. Although illustrated in a particular configuration, one or more operations of the method 300 may be omitted, repeated, or reorganized. Additionally, the method 300 may include other operations not illustrated in FIG. 3, for example, operations detailed in one or more other methods described herein.

As illustrated, a wireless device 302 (e.g., an example of the wireless device 104 of FIG. 1) can be capable of communicating with different network types. For example, the wireless device 302 can connect with terrestrial networks (e.g., a 3G, LTE, 4G, 5G, or other terrestrial network) or non-terrestrial networks. Terrestrial networks can be implemented through any number of base stations located at the surface of the Earth. The terrestrial network can include a home terrestrial network, one or more partnered terrestrial networks, and one or more non-partnered terrestrial networks. The home terrestrial network can have an MCC and MNC that are the same as the MCC and MNC indicated within an international mobile subscriber identity (IMSI) of the wireless device 302. The partnered terrestrial networks can have a partnership agreement with the home mobile network to provide roaming services to the wireless device 302 within a coverage area of the partnered terrestrial networks. The non-partnered terrestrial networks may not have a partnership agreement in place with the home terrestrial network but may still provide some limited services to the wireless device 302, such as emergency services, within a coverage region of the non-partnered terrestrial networks.

In contrast, satellite networks (or non-terrestrial networks) can be implemented through at least one satellite orbiting the Earth. As illustrated in FIG. 3, the wireless device 302 communicates with at least one satellite network 304. In aspects, the satellite network 304 includes a satellite network provided by a same mobile network provider as the home terrestrial network or having a partnership agreement with the home terrestrial network. Thus, the satellite network 304 can provide wireless communication services to the wireless device 302 within a coverage region of the satellite network 304. In aspects, non-partnered satellite networks can provide only limited services to the wireless device 302. As a result, non-partnered satellite networks can be treated similarly to non-partnered terrestrial networks in that the wireless device 302 generally will not attempt to connect with non-partnered networks when requesting non-emergency services.

The wireless device 302 includes communication logic 306 capable of controlling the transmission of signaling to a communications network (e.g., the satellite network 304 or a terrestrial network) and the reception of signaling from the communication network using a wireless transceiver. The communication logic 306 can be implemented in hardware, software, or firmware. In aspects, the communication logic 306 can process the signals received at the wireless transceiver in accordance with a communication technology. For example, the communication logic 306 can analyze system information received from available networks to determine if a network is available to provide a wireless communication service to the wireless device 302. In response to determining that a network is available to provide the network, the communication logic 306 can request to connect to the available network such that the available network can provide a wireless service to the wireless device.

The communication logic 306 can provide network information (e.g., located within system information blocks broadcast by proximate networks) to a device settings application 308 responsible for configuring the device to have particular device settings with which the wireless device 302 is to comply while connected to the available network. The device settings application 308 can utilize information about the available network to determine particular device settings for the wireless device 302 while the wireless device 302 is connected to the available network. The device settings application 308 can retrieve the device settings from device configuration data. The device configuration data can store sets of device settings with which the wireless device 302 is to comply while connected to respective networks associated with respective entries of network information in the device configuration data. The device settings can provide the wireless device 302 permission to request one or more wireless services from a network, prevent the wireless device 302 from requesting one or more wireless services from the network, or adjust a visual, auditory, or haptic characteristic of the wireless device 302. In some cases, the device configuration data can be associated with a particular mobile network provider to differentiate between sets of device settings with which the wireless device is to comply while connected to the different networks provided by the mobile network provider. In some cases, the device configuration data can include device settings associated with different types of networks (e.g., non-terrestrial networks, terrestrial networks, generations of these networks, and so on) such that the device settings application 308 can use the device configuration data to determine the device settings with which the wireless device 302 is to comply while connected to a particular type of network. Further details of the device configuration data can be described with respect to FIG. 4.

At 310, the wireless device 302 can receive broadcast information related to and broadcasted by a proximate network (e.g., a network whose coverage area includes the location of the wireless device). As illustrated, the satellite network 304 transmits network information that is received by the wireless device 302. For example, the satellite network 304 can transmit a PLMN code allocated to the satellite network 304 within system information blocks broadcast by the satellite network 304. The network information related to the satellite network 304 can be broadcast repeatedly at predetermined intervals. The wireless device

302 can receive the network information from the satellite network 304 while within a coverage region of the satellite network 304. For example, the communication logic 306 can tune a receiver of the wireless device 302 to receive the network information from the satellite network 304. If the wireless device 302 is outside of the coverage region of the satellite network 304, the wireless device 302 may be unable to receive the network information.

The communication logic 306 can analyze the network information to select a network to which the wireless device 302 is to connect. The network information can be analyzed at least once every predetermined period of time to enable network selection/re selection. As a specific example, network information can be analyzed at least once every six minutes to enable network selection/re selection once every six minutes.

The communication logic 306 can compare the network information to one or more lists of approved networks to which the wireless device 302 is approved to connect. In aspects, the approved networks can include a home terrestrial network of the wireless device 302 and at least one partnered network partnered with the home network to allow the wireless device 302 to roam on the partnered network. In some cases, the partnered network can include a partnered satellite network, such as the satellite network 304. The information associated with one or more of the approved networks can be stored in a list of approved mobile networks. Thus, the network information can be compared to the PLMN code of the home network and one or more PLMN codes of partnered networks to determine if the network information is associated with one or more approved networks. If so, the wireless device 302 can determine that an approved network is available to the wireless device 302.

At 312, the wireless device 302 can initiate a wireless access request to an approved network that is available to provide the wireless communication service. The wireless access request can be initiated in response to determine that an approved network is available to provide the wireless communication service. The wireless access request can be initiated by performing at least a portion of a network selection/re-selection procedure. For example, network information received from the satellite network 304 can be used to determine the satellite network 304 as an approved network. As a result, the wireless device 302 can initiate the wireless access request to the satellite network 304 to request the satellite network 304 to provide the wireless communication service to the wireless device 302. In response, the wireless device 302 can connect to the satellite network 304 such that the satellite network 304 provides the wireless service (e.g., message, call, data, or other services) to the wireless device 302.

At 314, the communication logic 306 can provide an indication of the network information to the device settings application 308. In some cases, the communication logic 306 only provides the device settings application 308 the indication of the network information once it is determined that the wireless device 302 will attempt to connect to the network. For example, the network information can be indicated to the device settings application 308 once the satellite network 304 is determined as an approved network capable of providing the wireless service. In some cases, the indication of the network information can be provided to the device settings application 308 after transmission of the network connection request.

At 316, the device settings application 308 determines the type of network with which the wireless device 302 is to connect. The determination can be based on the indication of the network information. In some cases, the network information can include the PLMN code of the network and determine the network type based on the PLMN code. For example, the wireless device 302 can compare the PLMN code to data that associates different PLMN codes with different network types. In doing so, the wireless device 302 can determine that the satellite network 304 is a non-terrestrial network. In response to determining that the satellite network 304 is a non-terrestrial network, the device settings application 308 can determine appropriate device settings for the wireless device 302 while connected to the satellite network 304 at 320.

Alternatively or additionally, at 318, the device settings application 308 can determine a mobile network provider associated with the network information. As discussed above, the satellite network 304 can be partnered with a home network of the wireless device. In some cases, the PLMN code of the satellite network 304 can be allocated to the satellite network 304 by a network provider of the home network of the wireless device 302. For example, the network provider of the home network of the wireless device 302 can have multiple associated PLMN codes, and the network provider can allocate one or more of the PLMN codes to the satellite network 304. The device settings application 308 can compare the PLMN code of the satellite network 304 to data associating PLMN codes with different mobile network providers. In doing so, the device settings application 308 can determine that the network information is associated with the mobile network provider of the home network. After determining that the network information is associated with the mobile network provider, the device settings application 308 can compare the network information to device configuration data that associates entries of network information of networks associated with the mobile network provider to different network types or sets of device settings. In this way, the device settings application 308 can determine appropriate settings for the wireless device 302 while connected to the satellite network 304 at 320.

Although the determinations at 316 and 318 are illustrated and described as being performed at the device settings application 308, in other cases, the determination at 316 and 318 can be performed at the communication logic 306 or any other component and an indication of the determination can be provided to the device settings application 308.

At 320, the device settings application 308 determines one or more device settings associated with the network information. The device settings application 308 can determine the device settings by comparing the network information to a device configuration data. The device configuration data can be maintained on the SIM or on any other storage within or coupled with the wireless device 302. Alternatively, the device settings application 308 can receive the device configuration data from the satellite network or any other wireless network using a receiver of the wireless device 302 and the communication logic 306. In aspects, the device configuration data can include one or more entries of network information, respective network types of respective ones of the entries of network information, or respective device settings associated with the respective ones of the entries of network information. Thus, by comparing the network information to the device configuration data, device settings with which the wireless device 302 is to comply while connected to the satellite network 304 can be determined.

In some embodiments, the device settings are determined after the satellite network 304 is determined to have a particular type that may require particular device settings. For example, the device settings application 308 can determine the device settings with which the wireless device 302 is to comply while connected to the satellite network 304 after determining that the satellite network 304 is a non-terrestrial network. In some cases, the device configuration data can associate a single set of device settings with a network type. In this way, the device settings can be determined by searching for the set of settings corresponding to the network type. In other cases, the device settings can be assigned on a per-network basis such that two different non-terrestrial networks can have different sets of device settings. Thus, the specific network information can be used to determine the appropriate set of device settings with which to comply while connected to the satellite network 304.

In some embodiments, the device settings are determined after the network information is determined to be associated with a particular provider. For example, the satellite network 304 can be allocated a PLMN code (e.g., the satellite network 304 broadcasts the PLMN code) that belongs to a first mobile network provider (e.g., is associated with the first mobile network provider in a PLMN code list) with which a second provider of the satellite network 304 is partnered. In aspects, the second provider of the satellite network 304 can have a partnership agreement with the first mobile network provider such that customers of the first mobile network provider can communicate on the satellite network 304. Given that the network information is associated with the first mobile network provider and allocated, by the first mobile network provider, to the satellite network 304, when the wireless device 302 analyzes the PLMN code of the satellite network 304, it can determine that the PLMN code belongs to the first mobile network provider. The first mobile network provider can allocate PLMN codes to different networks that operate better with different device settings. To accommodate the various sets of device settings associated with the different networks, the first mobile network provider can provide the wireless device 302 with device configuration data that includes various network information associated with respective device settings, and the wireless device 302 can reference the device configuration data once the network information is determined to be associated with the first mobile network provider.

At 322, the device settings application 308 can configure the wireless device 302 in accordance with the device settings determined at 320. Configuring the wireless device 302 in accordance with the device settings can be performed before or after connecting with the satellite network 304. In aspects, the wireless device 302 can be configured such that the wireless device 302 is unable to request one or more wireless services from the satellite network 304. For example, the wireless device 302 can be disabled from requesting voice call or data services from the satellite network 304 due to the reduced resources available on the satellite network. In doing so, not only can network resources be saved by not providing the wireless services, but also network resources can be saved by not having to communicate the connection requests for these services, which can be particularly beneficial in resource-constrained satellite networks. In some embodiments, the device settings can relate to a visual, auditory, or haptic characteristic of the wireless device 302. In this way, configuring the wireless device 302 to comply with the device settings can include adjusting a visual, auditory, or haptic characteristic of the wireless device 302. As specific examples, the wireless device 302 can display an icon indicative of a connection to the satellite network 304 on a display of the wireless device 302, output a sound indicative of a connection to the satellite network 304 using a speaker of the wireless device 302, or actuate a haptic element of the wireless device 302 to produce haptic feedback at the wireless device 302.

Although specific examples are provided, the method 300 can be performed to configure a wireless device 302 in accordance with different device settings. Moreover, the device settings application 308 can configure the wireless device 302 in response to different networks or different types of networks. Thus, from the foregoing, it is appreciated that the particular examples described with respect to FIG. 3 are but some of many possible examples.

FIG. 4 is a table that illustrates device configuration data 400 in accordance with aspects of the present technology. As discussed herein, the device configuration data 400 can include one or more entries of network information and respective ones of one or more device settings associated with respective entries of network information. The device configuration data 400 can be stored in any number of data structures (e.g., a table, linked list, multi-dimensional matrix, or tree). In aspects, the entries of network information can include respective PLMN codes of the networks (e.g., broken out into MCCs 402 and MNCs 404) or respective network types 406 of the networks. The device settings 408 can indicate one or more wireless services that the wireless device is enabled to request or disabled from requesting. In aspects, the device settings 408 can include a visual, auditory, or haptic characteristic of the wireless device.

Although the device configuration data 400 includes specific examples of entries of network information and associated device settings, other examples are considered. For example, the device configuration data 400 can exclude the MCCs 402, the MNCs 404, or the network types 406. In some cases, networks of the network types can have the same settings. Thus, the different MCCs 402 and MNCs 404 can be redundant and can be absent from the device configuration data 400. In this way, the device settings 408 can be associated with the network types 406. Alternatively, the device settings 408 can be associated with specific MCCs 402 and MNCs 404. In this way, different networks of the same network type can be associated with different device settings.

In some embodiments, the device configuration data 400 can be associated with a particular network provider. For example, the entries in the device configuration data 400 can have MNCs 404 associated with T-Mobile. Thus, the device configuration data 400 can provide the device settings 408 for the various networks associated with the particular network provider. The device configuration data 400 can be provided by the particular network provider (e.g., through a SIM card, over a wireless network, or otherwise). Given that the device configuration data 400 includes only data relating to the particular network provider, in some cases, the device configuration data 400 is utilized to only determine the device settings 408 in response to determining that the network information is associated with the particular network provider.

The example device configuration data 400 illustrated in FIG. 4 includes four entries of network information. Specifically, a first entry of network information has an MCC of 262, which is associated with the country Germany, and an MNC of 01, which is associated with T-Mobile in Germany. The first entry of network information further includes a network type that identifies the network as a terrestrial Long-Term Evolution (LTE) network. Thus, the network associated with the first entry of network information can be an LTE terrestrial network operated by T-Mobile and located in Germany. Given that LTE terrestrial networks are often not resource-constrained, the device settings associated with the first entry of network information can allow the wireless device to request message, voice call, and data services. Moreover, the LTE wireless device can display an LTE icon to indicate that the wireless device is connected to an LTE network.

Similar to the first entry of network information, the second entry of network information indicates that the associated network is a terrestrial network. However, the network associated with the second entry of network information can be indicated as a 5G network. Moreover, the MCC, 310, of the second entry of network indication indicates that the associated network is located in the United States, and the MNC, 660, indicates that the associated network is operated by T-Mobile in the United States. Given that the network is a terrestrial network that is likely not resource-constrained, the device settings associated with the second entry of network information can have message, voice call, and data services enabled. Further, the device settings can specify that the wireless device is to display an icon associated with a connection to a 5G network.

The third entry of network information is associated with a non-terrestrial network. In aspects, the non-terrestrial network can be a non-terrestrial network partnered with T-Mobile to provide wireless communication services. To enable the non-terrestrial network to be identified by its PLMN code, T-Mobile can allocate a PLMN code associated with T-Mobile to the non-terrestrial network. For example, T-Mobile can provide wireless devices (e.g., subscribed to T-Mobile) with the device configuration data 400 that indicates that a network having an MCC of 312 associated with the United States and an MNC of 190 associated with T-Mobile is a non-terrestrial network. The device configuration data 400 can further define the device settings with which a wireless device is to comply while connected to the network associated with the third entry of network information. As illustrated, the device settings enable the wireless device to request message services from the non-terrestrial network but can disable the wireless device from requesting voice call and data services from the non-terrestrial network due to the increased resources required for these services and the decreased resources available on the non-terrestrial network. Similarly, the device settings can cause the wireless device to display an icon on the display of the wireless device that indicates that the wireless device is connected to the non-terrestrial network.

The fourth entry of network information is similarly associated with a non-terrestrial network. In aspects, the non-terrestrial network associated with the fourth entry of network information can be partnered with a network provider (e.g., T-Mobile) to provide a wireless communication service. In contrast to the third entry of network information, the fourth entry of network information can have a PLMN code associated with a generic international network instead of a particular country. Moreover, the PLMN code can be associated with the particular network provider that provides the non-terrestrial network instead of a network provider with which the non-terrestrial network is partnered. As illustrated, the MCC of the non-terrestrial network is 901, which is associated with international networks, and the MNC is 35, which is associated with the network provider "Satellite Wireless." To conserve resources on the non-terrestrial network, the device settings associated with the fourth entry of network information enable the wireless device to request message and voice call services but not data services. Moreover, the device settings can cause the wireless device to indicate that it is connected to the non-terrestrial network. As illustrated, the device settings associated with the fourth entry of network information cause the wireless device to output a sound that indicates that the wireless device is connected to the non-terrestrial network.

As illustrated, in some cases, the non-terrestrial networks can be indicated within the device configuration data 400 as having a PLMN code that belongs to and is allocated by a partnered network provider. In other cases, the non-terrestrial networks can have their own separate PLMN code. Moreover, the device configuration data 400 can specify device settings for each network type or for each network. Thus, in some embodiments, the individual network-specific information (e.g., MCC or MNC) or the network type can be omitted from the device configuration data.

In general, the device configuration data 400 can include other network information capable of being used to identify a network with which a wireless device can connect. Moreover, the device configuration data 400 can include other device settings. For example, the device configuration data 400 can include device settings that cause the wireless device to alter one or more characteristics of the wireless device, enable/disable one or more features on the wireless device, adjust one or more parameters defining communication between the wireless device and a mobile network, and so on.

Figure 5A:
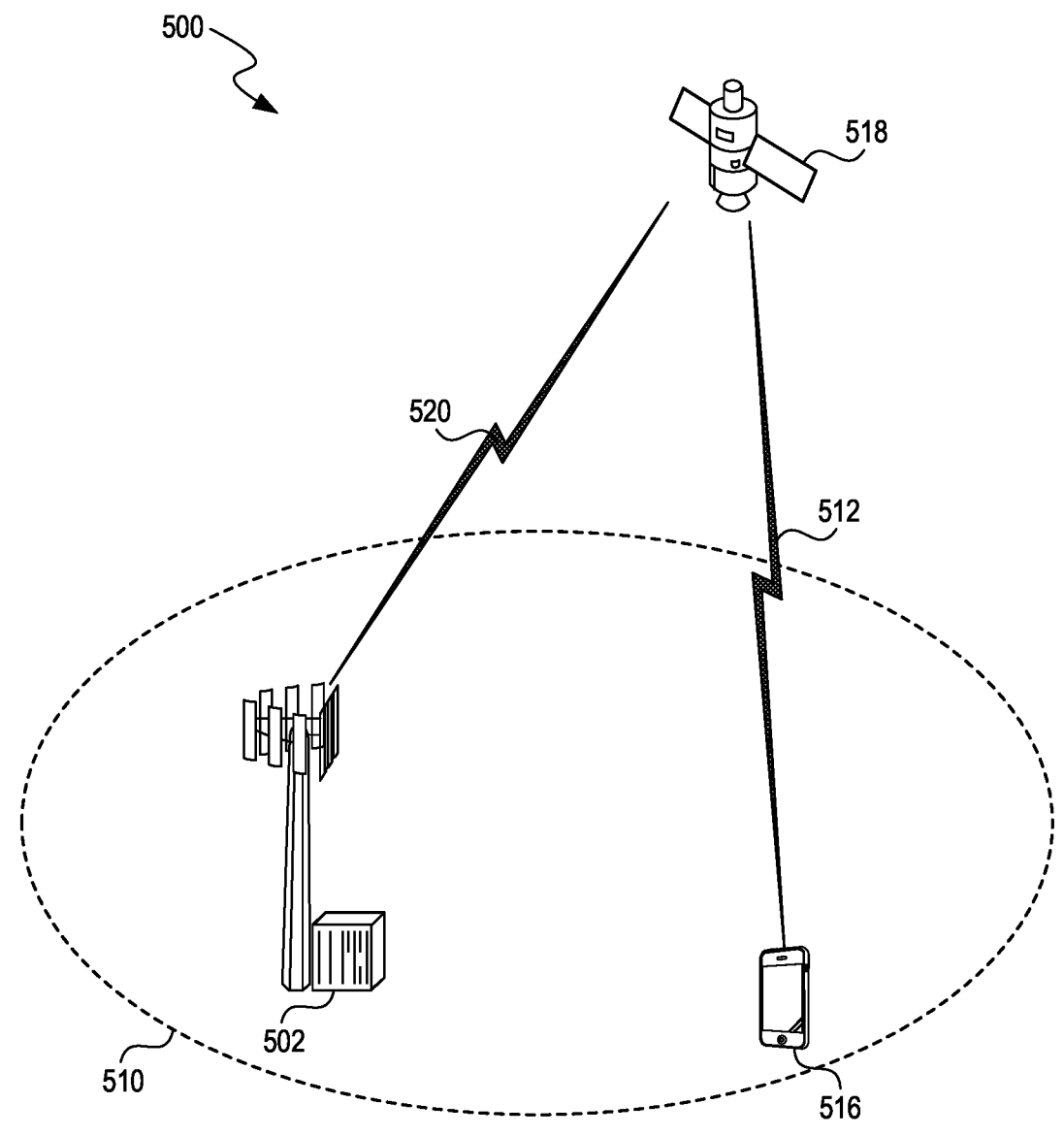
FIG. 5A is a drawing that illustrates an example wireless communications system supporting non-terrestrial networks in accordance with aspects of the present technology.

FIG. 5A is a drawing that illustrates an example wireless communications system 500 supporting a non-terrestrial network (sometimes referred to as a satellite network) in accordance with aspects of the present technology. A non-terrestrial network can, as an alternative to satellite 518, include high-altitude platforms (HAPs), such as stratospheric balloons, blimps, or the like. The wireless communications system 500 is implemented using components of the example computer system 1100 illustrated and described in more detail with reference to FIG. 11. For example, the wireless communications system 500 can be implemented using processor 1102 and instructions 1108 programmed in the memory 1106 illustrated and described in more detail with reference to FIG. 11. Likewise, implementations of the wireless communications system 500 can include different and/or additional components or be connected in different ways.

In some examples, the wireless communications system 500 implements aspects of the wireless telecommunications network 100 illustrated and described in more detail with reference to FIG. 1. The wireless communications system 500 includes a base station 502, a UE 516, and a satellite 518, that are examples of the corresponding devices illustrated and described in more detail with reference to FIG. 1. The satellite 518 relays communications between base stations (e.g., base station 502) and mobile terminals (e.g., UE 516). The base station 502 is sometimes referred to as a gateway. The geographical area associated with a transmission beam of the satellite 518 is sometimes called a beam footprint 510, and UE 516 can communicate with the satellite 518 while the UE 516 is located within the beam footprint 510. In some cases, the base station 502 is located within the beam footprint 510, and in other cases, the base station 502 is outside the beam footprint 510. Even when the base station 502 is located within the beam footprint 510, the base station 502 may be down or otherwise unavailable to provide connectivity to the UE 516.

The satellite 518 generates satellite information (e.g., ephemeris information or network information) associated with communications between the satellite 518, the UE 516, and/or the base station 502. The satellite 518 transmits, via a wireless communication link 520, the satellite information to the base station 502. The satellite 518 transmits, via a wireless communication link 512, the satellite information to the UE 516 located within the beam footprint 510. The wireless communication link 512 is part of a non-terrestrial network.

The UE 516 can receive network information from a communication network including the satellite 518, as described in more detail with reference to FIGS. 3-4. In some implementations (e.g., while UE 516 is located within the beam footprint 510), the network information indicates that the communication network (including connectivity provided by the satellite 518) is available for use by the UE 516. The UE 516 can determine satellite network availability as described in more detail with reference to FIG. 3.

In response to determining that the communication network is available, the UE 516 connects to the communication network (including wireless communication link 512). The UE 516 determines, based on the network information, that the communication network is a non-terrestrial communication network, as described in more detail with reference to FIGS. 3-4. In response to determining that the communication network is a non-terrestrial communication network, at least one software application installed on the UE 516 can be rendered inoperable while the UE 516 is connected to the non-terrestrial communication network. An example software application 522 rendered inoperable on a mobile device 520 is illustrated and described in more detail with reference to FIG. 5B. In some implementations, a software application is rendered inoperable based on device configuration data of the UE 516. Device configuration data and device settings are illustrated and described in more detail with reference to FIGS. 3-4.

In some embodiments, a user of the UE 516 can select which non-terrestrial communication network to connect to, when multiple satellite networks are available. Such a situation can occur when a mobile network operator of the UE 516 has relationships with different non-terrestrial communication network providers. Each non-terrestrial communication network can have different constraints on resources and can provide different services or types of services. In some examples, a user could simply put UE 516 into a power-saving mode when connecting to a non-terrestrial communication network.

In some implementations, while connected to a resource-constrained non-terrestrial communication network, the UE 516 enters a lower-power state, also referred to as "sleep mode," so as to reduce power consumption and increase battery life for the UE 516. The UE 516 can wakeup on a schedule to receive a downstream transmission from base station 502 and/or the satellite 518. The time periods allocated prior to and following the wakeup actions can benefit the satellite 518 by reducing or eliminating interferences between the UE 516 transmission and a transmission from another neighboring UE.

Figure 5B:
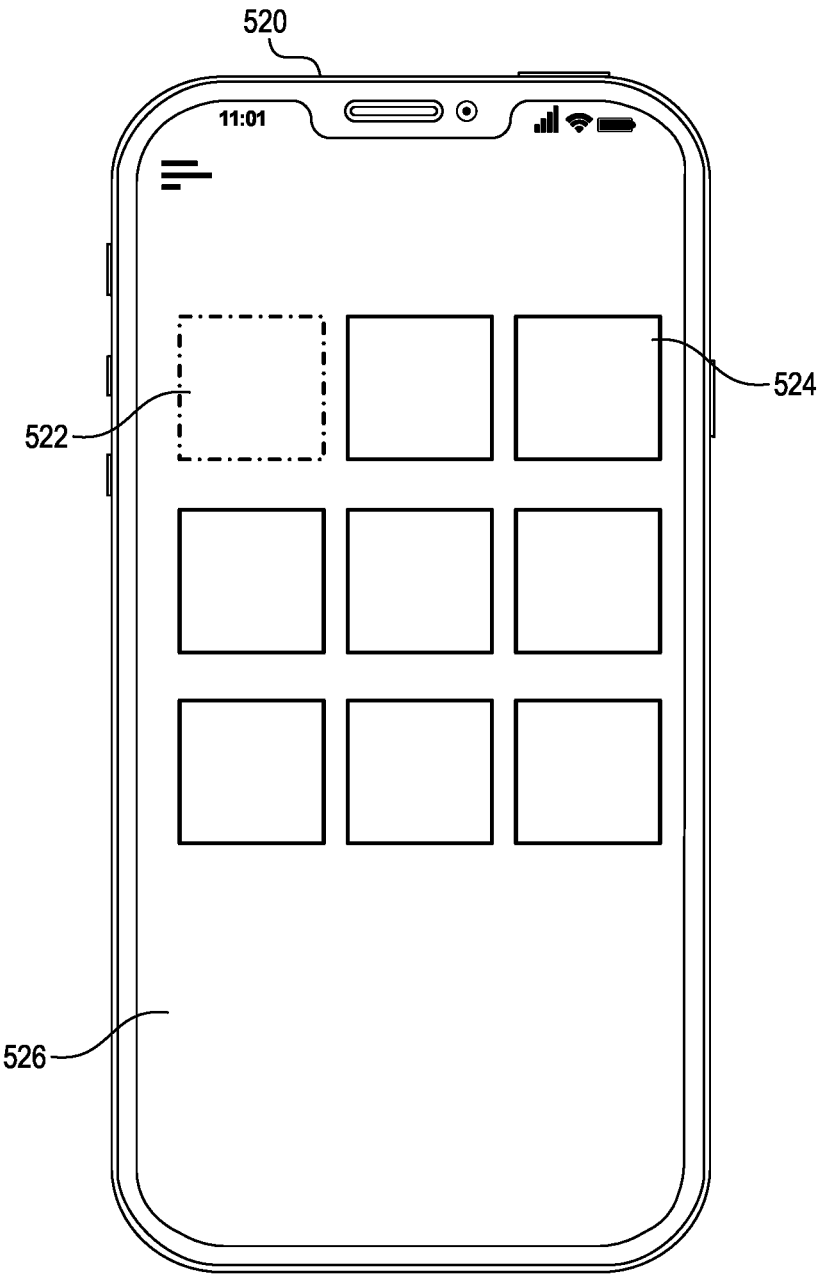
FIG. 5B is a drawing that illustrates an example mobile device having a disabled application while connected to a satellite network in accordance with aspects of the present technology.

FIG. 5B is a drawing that illustrates an example mobile device 520 having an application 522 that is disabled while the mobile device 520 is connected to a satellite network in accordance with aspects of the present technology. An example satellite 518 is illustrated and described in more detail with reference to FIG. 5A. The mobile device 520 is implemented using components of the example computer system 1100 illustrated and described in more detail with reference to FIG. 11. For example, the mobile device 520 can be implemented using processor 1102 and instructions

1108 programmed in the memory 1106 illustrated and described in more detail with reference to FIG. 11. Likewise, implementations of the mobile device 520 can include different and/or additional components or be connected in different ways.

In some implementations, the mobile device 520 receives network information from a communication network, as described in more detail with reference to FIGS. 3-4. In response to receiving the network information, the mobile device 520 determines, based on the network information, that the communication network is a non-terrestrial communication network. An example non-terrestrial communication network provided by a satellite 518 is illustrated and described in more detail with reference to FIG. 5A. The mobile device 520 is configured to operate in a non-terrestrial mode, e.g., a mode in which the mobile device 520 sends and receives less data. The mobile device 520 connects to the communication network to operate in the non-terrestrial mode (sometimes referred to as satellite mode). While the mobile device 520 is operating in the non-terrestrial mode, the mobile device 520 greys out at least one software application 522 on an electronic display 526 of the mobile device 520 to render the software application 522 inaccessible by a user of the mobile device 520. For example, the software application 522 requires data services or voice call services and could strain the resources of the communication network.

The user can continue to use other software applications 524 that do not need a large amount of data. In some embodiments, the mobile device 520 renders the software application 522 inoperable in satellite mode. Rendering the software application 522 inoperable prevents the mobile device from accessing data services. Rendering the software application 522 inoperable while the mobile device 520 is connected to the non-terrestrial communication network reduces greenhouse gas emissions compared to operating the software application 522 while the mobile device 520 is connected to the non-terrestrial communication network. The greenhouse gas emissions are reduced as a result of less data being stored and transported in satellite mode, and less electrical power consumption by the mobile device 520 and the non-terrestrial communication network in satellite mode.

In some implementations, the mobile device 520 uses the network information and device configuration data of the mobile device 520, as described in more detail with reference to FIGS. 3-4. The device configuration data is used to configure one or more particular device settings of the mobile device 520 to render the software application 522 installed on the mobile device 520 inoperable while the mobile device 520 is using connectivity provided by a satellite. The non-terrestrial communication network (including connectivity provided by a satellite) can be resource-constrained and associated with less than a threshold bandwidth. The software application 522 is prevented from operating on the non-terrestrial communication network because the application 522 requires at least the threshold bandwidth to operate.

In some implementations, the mobile device 520 terminates background operation of the software application 522 on the mobile device 520 (e.g., if the software application 522 is running in the background). A user can previously select apps to be greyed out or disabled for satellite mode. For example, the mobile device 520 can be configured to enable a user to indicate that the software application 522 is to be disabled while the mobile device 520 is connected to a satellite network. For example, the user has the ability (using menu options on the mobile device 520) to select which software applications to grey out or render inoperable while the mobile device 520 is connected to a satellite network. In some examples, the mobile device 520 can itself determine which software applications are data-hungry and grey them out.

A software application that is greyed out can be a voice call or Voice over Internet Protocol (VOIP) application. Greying out the software application therefore prevents the mobile device 520 from accessing voice call services. In some implementations, the mobile device 520 enables pay-per-use for applications 522 or 524 installed on the mobile device 520 while the mobile device 520 is operating in a non-terrestrial mode. Pay-per-use is metered use of application 524, where the user is charged for the access. The user may authorize an agreement that initiates a payment every time they use the application 524 on a satellite network. Pay-per-use can reduce strain on resource-constrained networks as well as make the value relationship clear to the user. Pay-per-use also benefits the user by providing granular, use-by-use data for the application 524's usage.

In some implementations, the mobile device 520 enables pay-per-message for applications 522 or 524 installed on the mobile device 520 while the mobile device 520 is operating in a non-terrestrial mode. When pay-per-message is enabled, the user is charged for messages (text, video, data files, images, voice, etc.) sent using, e.g., the application 524. In some examples, prices are applied per message part based on the destination, a number type used, or the carrier the message is sent to. In some examples, text character limits or data limits are applied.

Figure 5C:
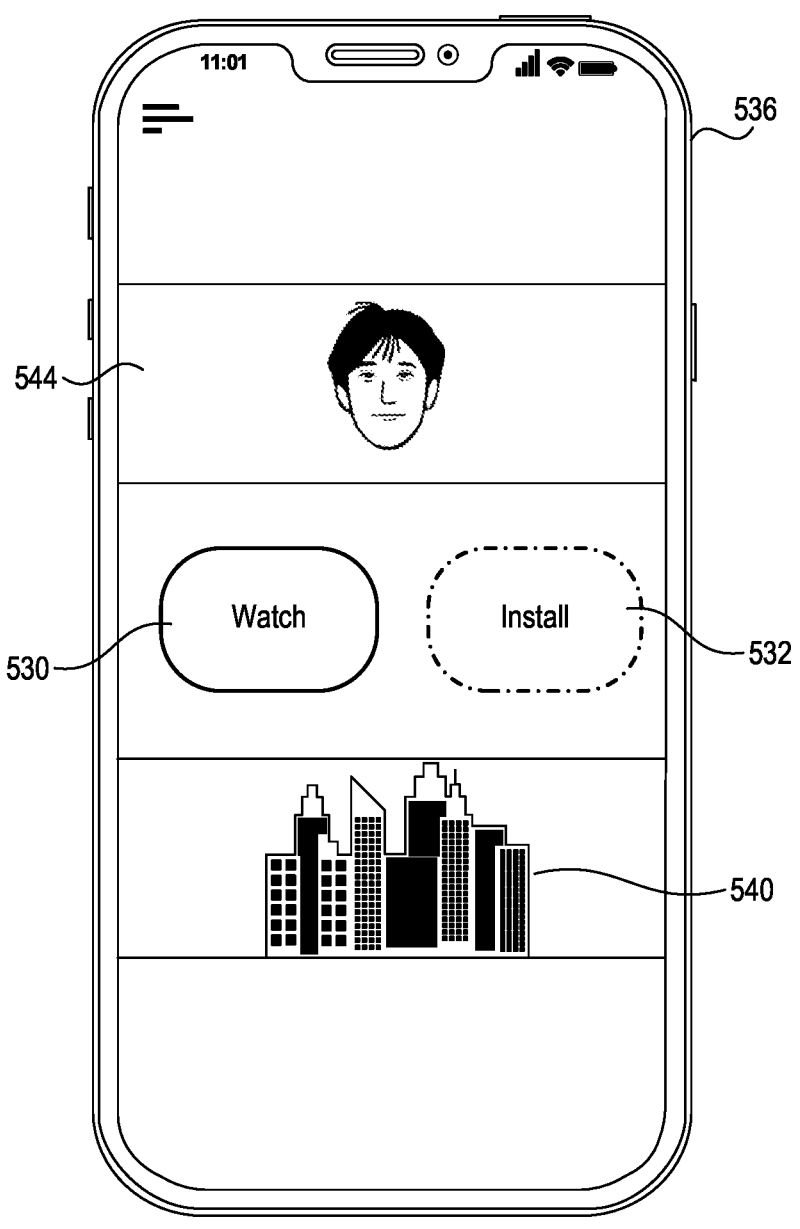
FIG. 5C is a drawing that illustrates an example mobile device having an application with a disabled feature while connected to a satellite network in accordance with aspects of the present technology.

FIG. 5C is a drawing that illustrates an example mobile device 536 having an application with a feature 532 that is disabled while the mobile device 536 is connected to a satellite network in accordance with aspects of the present technology. An example satellite 518 is illustrated and described in more detail with reference to FIG. 5A. The mobile device 536 is implemented using components of the example computer system 1100 illustrated and described in more detail with reference to FIG. 11. For example, the mobile device 536 can be implemented using processor 1102 and instructions 1108 programmed in the memory 1106 illustrated and described in more detail with reference to FIG. 11. Likewise, implementations of the mobile device 536 can include different and/or additional components or be connected in different ways.

In some implementations, the mobile device 536 greys out a feature 532 of an application 544 installed on the mobile device 536 to render the feature 532 inaccessible by a user of the mobile device 536 while the mobile device 536 is connected to a non-terrestrial communication network. An example non-terrestrial communication network is illustrated and described in more detail with reference to FIG. 5A. The application can be a messaging application, where sending emojis, images, or videos in a message is disabled while text messages are allowed. In some embodiments, a particular feature 530 of application 544 that requires data download for displaying video 540 is rendered inoperable while the mobile device 536 is connected to a resource-constrained non-terrestrial communication network. A user can previously indicate features to be rendered inoperable on satellite networks, or the mobile device 536 can determine which features require data services and grey them out.

In some implementations, the mobile device 536 groups a set of applications (e.g., streaming applications, such as Netflix™, Hulu™, or Spotify™, that can need more data) into a group that is automatically greyed out or disabled while the mobile device 536 enters satellite mode. Content that is stored offline on the mobile device 536 can still be accessed and played on the mobile device 536 in satellite mode.

When the mobile device 536 determines that no approved terrestrial network is available to provide a particular wireless communication service (e.g., a wireless communication service that the user is in need of), the mobile device 536 can determine a set of connectivity services associated with each respective satellite network of the one or more satellite networks (e.g., in a mobile network greylist). For instance, the mobile device 536 can determine which of several available satellite networks offer the particular wireless communication service that the user is in need of as well as other wireless communication services that a given satellite network can provide. The mobile device 536 can then select a particular satellite network of the one or more satellite networks to generate a wireless access request to the satellite network based on a corresponding set of connectivity services (e.g., including the particular wireless communication service). For instance, to reduce satellite network congestion, the mobile device 536 determines that a given satellite network offers the particular wireless communication service prior to generating or transmitting a wireless access request to the satellite network to establish a connection with the satellite network. In this way, the mobile device 536 reduces satellite network congestion by limiting access to satellite networks to instances where (i) a terrestrial network cannot provide a particular wireless communication service and (ii) a given satellite network can provide the particular wireless communication service.

FIG. 6 is a flow diagram that illustrates an example process 600 in accordance with aspects of the present technology. In some implementations, the process 600 is performed by mobile device 520 illustrated and described in more detail with reference to FIG. 5B. In some implementations, the process is performed by a computer system, e.g., example computer system 1100 illustrated and described in more detail with reference to FIG. 11. Particular entities, for example, mobile device 536 or system 500, perform some or all of the steps of the process 600 in other implementations. The mobile device 536 and system 500 are illustrated and described in more detail with reference to FIGS. 5A and 5C, respectively. Likewise, implementations can include different and/or additional steps or can perform the steps in different orders.

At 604, a mobile device determines that a first communication network associated with a mobile network operator of the mobile device is unavailable. For example, the mobile device is UE 710 and the first communication network is communication network 721 illustrated and described in more detail with reference to FIG. 7. The mobile network operator of the mobile device is the primary wireless provider to the mobile device, and operates the communication network 721, which is a terrestrial network in some examples. The first communication network can be associated (by specification or service level agreement) with a first bandwidth and/or a first upload latency and/or a first download latency. Multiple software applications are installed on the mobile device, e.g., applications 522, 524 illustrated and described in more detail with reference to FIG. 5B.

At 608, the mobile device receives network information from a second communication network. Example network information is illustrated and described in more detail with reference to FIGS. 3-4. An example of the second communication network is communication network 722 illustrated and described in more detail with reference to FIG. 7. In some examples, the second communication network is a resource-constrained non-terrestrial network. The network information indicates that the second communication network is available for the mobile device to connect to and use. The mobile device can determine satellite network availability as described in more detail with reference to FIG. 3.

At 612, in response to determining that the second communication network is available, the mobile device connects to the second communication network. For example, the mobile device initiates a wireless access request to the second communication network. The wireless access request can be initiated in response to determine that the second communication network is available to provide wireless services. The mobile device connects to the second communication network to access wireless service (e.g., message, call, data, or other services).

At 616, the mobile device determines, based on the network information, that the second communication network is a non-terrestrial communication network. The determination is performed as described in more detail with reference to FIGS. 3-4. The second communication network is associated with a bandwidth less than a threshold bandwidth. Satellite networks can be difficult or costly to implement, resulting in these networks having decreased bandwidths or greater latency. Thus, satellite networks can be resource-constrained due to increased competition for limited communication resources.

At 620, in response to determining that the second communication network is a non-terrestrial communication network, the mobile device configures the mobile device to operate in a non-terrestrial mode. When the mobile device is connected to a terrestrial network, it operates in or can be set to a terrestrial mode by the mobile device or by a user. In some embodiments, a user can set the mobile device to operate in the non-terrestrial mode when connecting to the non-terrestrial communication network, using a menu option. The second communication network can be associated (by specification, service level agreement, or in the network information) with a second bandwidth and/or a second upload latency and/or a second download latency. The first bandwidth is typically greater than the second bandwidth because the second communication network is a resource-constrained network. The first upload latency is typically less than the second upload latency, and the first download latency is typically less than the second download latency.

At 624, the mobile device renders at least one of the multiple software applications inoperable while the mobile device is operating in the non-terrestrial mode. For example, application 522 described in more detail with reference to FIG. 5B, is rendered inoperable or disabled. In some examples, the mobile device determines that a user of the mobile device previously indicated that the software application is to be disabled while the mobile device is connected to a network providing less than the threshold bandwidth. In some examples, the mobile device determines which applications to grey out or disable based on analyzing the second bandwidth, second upload latency, second download latency, and/or the requirements of the applications installed on the mobile device. In some examples, the mobile device determines that the user previously indicated that the software application is to be disabled while the mobile device is connected to a satellite network. In response to the determination, the software application is to be disabled by the mobile device.

The software application is disabled because it can require at least the threshold bandwidth to operate, and could therefore strain the second communication network. In some implementations, the mobile device removes the software application from an electronic display of the mobile device. An example electronic display 526 is illustrated and described in more detail with reference to FIG. 5B. Removing the software application from the display renders the application inaccessible by a user while the mobile device is in satellite mode. In some implementations, the mobile device terminates background operation of the software application on the mobile device. In some implementations, the mobile device greys out the software application on the display of the mobile device to render the software application inaccessible by a user of the mobile device.

Figure 7:
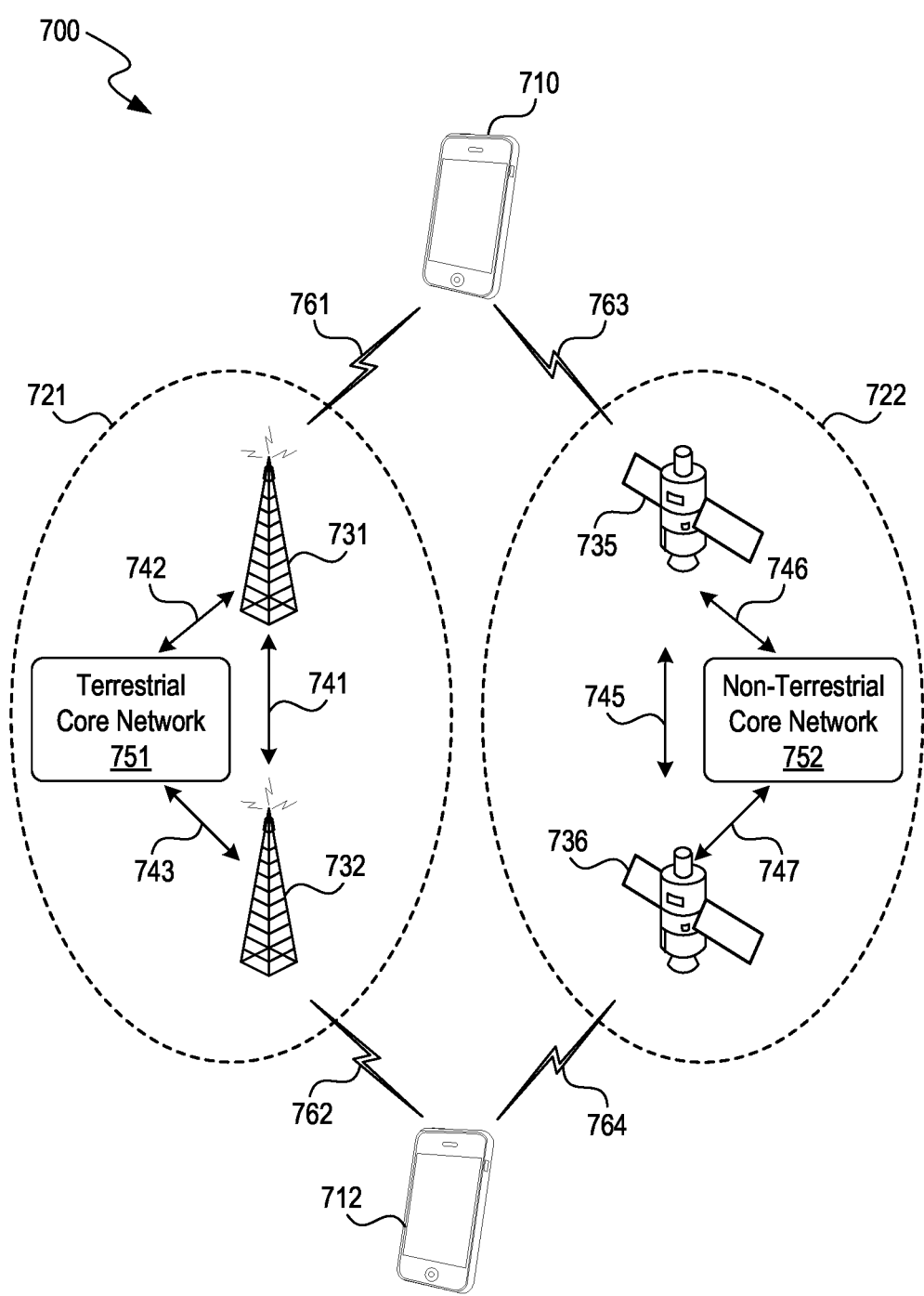
FIG. 7 is a drawing that illustrates an example wireless communications system associated with user equipment having dual connectivity with a terrestrial network and a satellite network in accordance with aspects of the present technology.

FIG. 7 is a drawing that illustrates an example wireless communications system 700 associated with user equipment having dual connectivity with a terrestrial network 721 and a satellite network 722 in accordance with aspects of the present technology. The wireless communications system 700 is implemented using components of the example computer system 1100 illustrated and described in more detail with reference to FIG. 11. For example, the wireless communications system 700 can be implemented using processor 1102 and instructions 1108 programmed in the memory 1106 illustrated and described in more detail with reference to FIG. 11. Likewise, implementations of the wireless communications system 700 can include different and/or additional components or be connected in different ways.

The wireless communications system 700 includes a user equipment (UE) 710 and a terminal device 712 wirelessly communicating data using multiple wireless-communication networks illustrated as wireless communication networks 721, 722. As shown in the example of FIG. 7, the UE 710 is implemented as a smartphone. Although illustrated as a smartphone, the UE 710 can be implemented as any suitable computing or electronic device, such as a mobile communication device, a modem, cellular phone, gaming device, navigation device, media device, laptop computer, desktop computer, tablet computer, wearable computer, smart appliance, vehicle-based communication system, and the like. Also, in the example of FIG. 7, the terminal device 712 is implemented as a smartphone (e.g., another user equipment). However, and in general, the terminal device 712 can be any device that receives (or transmits) data via the wireless communication networks 721, 722. The terminal device 712 can be, for example, a server or other hardware that is associated with a cloud storage service, a content provider (e.g., a video or music content provider), a ground-based destination network, or a general Internet access device.

The UE 710 engages with the first wireless-communication network 721 using a first radio-access technology (RAT) that may operate in accordance with frequencies and protocols that may be associated with a Third-Generation partnership project long-term evolution (3GPP LTE) standard, a Fifth-Generation new radio (5G NR) standard, or any other suitable standard.

The first wireless-communication network 721 includes multiple wireless-communication platforms illustrated as terrestrial base stations 731, 732 that are implemented in a macrocell, microcell, small cell, picocell, or the like. Furthermore, the terrestrial base stations 731, 732 can be an Evolved Universal Terrestrial Radio Access Network Node B, E-UTRAN Node B, evolved Node B, eNodeB, eNB, Next Generation Node B, gNode B, or a gNB terrestrial base station. The terrestrial base stations 731, 732 can communicate with elements of the wireless first wireless-communication network 721 by way of one or more interfaces 741,

742, 743. Interface 741 may be, for example, an Xn interface, an X2 interface, or the like. Interfaces 742, 743 connect terrestrial base stations 731, 732 to terrestrial core network 751, which can include hardware of one or more servers, routers, switches, control elements, and the like that operate in accordance with frequencies and protocols that might be associated with a particular RAT standard. In embodiments where the terrestrial core network 751 is operating in accordance with protocols and frequencies that can be associated with the 5G NR standard, for example, interfaces 742, 743 can include a combination of an NG2 interface for control-plane signaling and an NG3 interface for user-plane data communications. In implementations where the terrestrial core network 751 operates in accordance with protocols and frequencies associated with a the 3GPP LTE standard, interfaces 742, 743 include an S1 interface for control-plane signaling and user-plane data communications.

In general, the first wireless-communication network 721 performs to a service level that corresponds to a first quality of service (QOS). Based on factors such as wireless-communication frequencies, wireless-communication congestion levels, terrestrial interferences, distances between the terrestrial base stations 731, 732, wireless-communication signal strengths, and the like, a first QoS is attributable to the first wireless-communication network 721. Factors such as a wireless-communication latency, a data-packet loss rate, or the like, may quantify the first QoS.

The UE 710 further engages with a second wireless-communication network 722 using a second RAT that operates in accordance with frequencies and protocols associated with a Mobile Satellite Service (MSS). Furthermore, the second wireless-communication network 722 includes one or more wireless-communication platforms (satellites 735, 736), which are non-terrestrial and may be, for example, a low earth orbit (LEO) satellite, a medium earth orbit (MEO) satellite, or a geostationary earth orbit (GEO) satellite. The satellites 735, 736 communicate with elements of the second wireless-communication network 722 by way of one or more interfaces 745, 746, 747. Interface 745 supports an inter-satellite link (ISL) connecting satellites 735, 736 and can be an optical interface, a laser interface, or a radio-frequency (RF) interface. Interfaces 746, 747 support gateway links (GWLs) connecting satellites 735, 736, respectively, to core non-terrestrial network 752) that can include hardware of one or more satellite ground stations, servers, routers, switches, control elements, and the like. Interfaces 746, 747 are, for example, Consultative Committee for Space Data Systems (CCSDS) interfaces.

The second wireless-communication network 722 performs to a service level that corresponds to a second quality of service (QOS). Based on factors such as wireless-communication frequencies, wireless-communication congestion levels, distances between the satellites 735, 736, wireless-communication signal strengths, and the like, a second QoS is attributable to the second wireless-communication network 722. Factors such as a wireless-communication latency, a data-packet loss rate, or the like, may quantify the second QoS. UE 710 can engage with the wireless-communication networks 721, 722 by way of multiple wireless links 761, 762, 763, 764. Each wireless link can include a downlink radio connection and an uplink radio connection.

As illustrated and as part of dual-connectivity, the UE 710 is in a first engaged mode (terrestrial mode) with the terrestrial base station 731 of the first wireless-communication network 721 by way of the wireless link 761 and in a second engaged mode (non-terrestrial mode) with the satellite 735 of the second wireless-communication network

722 by way of the wireless link 763 (the wireless link 763 to the satellite 735 may sometimes be referred to as a mobile user link (MUL)). It is worth noting that such engagement modes (e.g., the first engaged mode and the second engaged mode) may correspond to engaged modes (or "connected" modes) as defined by respective RAT protocols and standards. In simple terms, an engaged mode may signify that an ongoing wireless connection has been established between the UE 710 and the terrestrial base station 731 and/or the satellite 735.

In an instance where the UE 710 uses a same RAT to engage with the terrestrial base station 731 and the satellite 735, the UE 710 may be in a single engaged mode. For example, if the UE 710 is engaged with the base station 731 and the satellite 735 using a 5G NR RAT, the UE 710 may be in an RRC_Connected mode as defined by 5G NR wireless protocols and standards. In such an instance, the separate wireless links 761, 763 may occur at physical (PHY), media access control (MAC), radio link control (RLC), or packet data convergent protocol (PDCP) layers that conform to 5G NR wireless protocols and standards.

The wireless-communication platforms of the second wireless-communication network may, as an alternative to satellites 735, 736), include high-altitude platforms (HAPs), such as stratospheric balloons, blimps, or the like (not illustrated in FIG. 7). In the instance of a second wireless-communication network that includes HAPs, the QoS may not necessarily be the same as that in the instance of the second wireless-communication network that includes satellites 735, 736.

In some implementations, a software application installed on the UE 710 receives network information including a RAT type of the network 722 to which the UE 710 is connected or about to connect to. Different RAT types are described in more detail in the 3GPP Specification Release 17, which is incorporated by reference herein. The software application can be a streaming application, and can stream at a first bit rate while the UE 7101 is connected to terrestrial communication network 721, e.g., a terrestrial network operated by a wireless service provider of the UE 710. In accordance with the RAT type, the software application is configured to stream at a second bit rate lower than the first bit rate while the UE 710 is connected to the non-terrestrial communication network 722. The UE 710 and/or software application can also determine a type of wireless connection platform of a non-terrestrial network (e.g., HAP, GEO, LEO, or MEO). The UE 710 and/or app can be configured to stream at different bit rates based on the type of type of wireless connection platform. Apps can also be enabled/disabled and/or greyed out based on the type of type of wireless connection platform that the UE 710 is connected to.

In some implementations, the software application is configured to stream at different bit rates in accordance with a QoS provided by the non-terrestrial communication network 722. The QoS can be associated with the RAT type. For example, the software application can determine, based on the RAT type, at least one available network resource of the non-terrestrial communication network 722. The network resources can include a bandwidth, a latency, and/or a data packet loss rate of the non-terrestrial communication network 722. The software application can be configured to stream at different bit rates based on the network resources. In some example, the QoS is based on a frequency range of the non-terrestrial communication network 722, a congestion level of the non-terrestrial communication network 722, and/or a signal strength of the non-terrestrial communication network 722.

In some implementations, the software application prevents a messaging application installed on the UE 710 from sending rich text messages, emojis, audio, and/or video while the UE 710 is connected to the non-terrestrial communication network. Preventing the data-heavy services can be based on the RAT type of the network 722. For example, the software application stops streaming 4K video while the UE 710 is connected to the non-terrestrial communication network 722.

In some implementations, the software application determines that the UE 710 switched from the non-terrestrial communication network 722 to a different satellite network. For example, the non-terrestrial communication network 722 has a first link quality, and the satellite network has a second link quality different from the first link quality. Link quality can be measured using signal-to-noise ratio (SNR), bit error rate (BER), and modulation and coding scheme (MCS). SNR measures the ratio of the received signal power to the noise power at the receiver, with higher values indicating a stronger and clearer signal. BER measures the fraction of bits that are corrupted or lost during transmission, with lower values indicating more accurate and error-free transmission. MCS is a combination of modulation technique (how bits are represented by the signal) and coding technique (how bits are protected from errors) used for transmission, with higher values meaning a higher data rate and spectral efficiency, but also a higher sensitivity to noise and fading. The software application is configured, in accordance with the second link quality, to stream at a third bit rate different from the second bit rate while the UE 710 is connected to the satellite network. The UE 710 can thus stream data at different bit rates and adjust other features based on link quality.

In some implementations, the software application (periodically) monitors at least one available network resource of the non-terrestrial communication network 722 while the UE 710 is connected to the non-terrestrial communication network 722. The software application adjusts the second bit rate based on a change in the available network resource. For example, if the software application determines that bandwidth provided by the network 722 (or another network that the UE 710 switches to) has changed, the bit rate can be adjusted. In some implementations, in response to determining that the UE 710 is connected to a non-terrestrial communication network, the software application is configured to use an access point name (APN) associated with non-terrestrial communication networks while the UE 710 is connected to the non-terrestrial communication network. The software application is configured to stream at a second bit rate lower than the first bit rate while the software application is using the APN.

Additional APNs can be established to control access to a non-terrestrial network's resources by mobile devices. The APNs enable a user and/or a mobile network operator to customize network settings, such that applications operate in accordance with resource constraints of satellite networks. Using such additional APN, access by mobile applications can be tailored to the resources of non-terrestrial networks. For example, APNs backed by a software-defined network (SDN) can be customized, such that a virtual mobile network is created.

In some implementations, the UE 710 determines, based on network information, at least one available network resource of the non-terrestrial communication network 722.

For example, the available network resources include a bandwidth, a latency, and/or a data packet loss rate of the non-terrestrial communication network 722. The UE 710 can select an APN from among multiple APNs based on the network resources. In some examples, the selected APN is associated with a network QoS. The UE 710 can prevent, in accordance with the APN, the software application from sending rich text messages, emojis, audio, and/or video to avoid straining network resources. In some examples, the UE 710 prevents the software application from streaming 4K video in accordance with the APN, such that only lower-quality video is streamed.

In some implementations, an application installed on the UE 710 determines that the UE 710 switched from the non-terrestrial communication network 722 to a satellite network different from the non-terrestrial communication network 722. The application is configured, in accordance with a second APN associated with the satellite network, to stream at a third bit rate different from the second bit rate. Streaming at the second bitrate while the UE 710 is connected to the non-terrestrial communication network 722 reduces greenhouse gas emissions compared to streaming at the first bit rate because of the reduced amount of data generated, stored, manipulated, and transported.

FIG. 8 is a flow diagram that illustrates an example process 800 in accordance with aspects of the present technology. In some implementations, the process 800 is performed by the UE 710 illustrated and described in more detail with reference to FIG. 7. In some implementations, the process is performed by a computer system, e.g., example computer system 1100 illustrated and described in more detail with reference to FIG. 11. Particular entities, for example, terminal device 712, perform some or all of the steps of the process 800 in other implementations. The terminal device 712 is illustrated and described in more detail with reference to FIG. 7. Likewise, implementations can include different and/or additional steps or can perform the steps in different orders.

At 804, a mobile device receives network information including at least one PLMN code from a non-terrestrial communication network to which the mobile device is connected. The radio network thus sends information to the mobile device regarding available resources. PLMN codes are described in more detail with reference to FIGS. 3-4, while an example non-terrestrial communication network 722 is illustrated and described in more detail with reference to FIG. 7. A streaming application installed on the mobile device is configured to stream data at a first bit rate while the mobile device is connected to a terrestrial communication network, as described in more detail with reference to FIG. 7.

At 808, the mobile device determines, based on the PLMN code, at least one available network resource of the non-terrestrial communication network. The available network resources include a bandwidth, a latency, and/or a data packet loss rate of the non-terrestrial communication network. The streaming application can be configured to offer differentiated services to a user based on the bandwidth, a latency, and/or a data packet loss rate of the non-terrestrial communication network. The network information can also indicate whether the wireless-communication platform (e.g., satellites 735, 736) is a low earth orbit (LEO) satellite, a medium earth orbit (MEO) satellite, or a geostationary earth orbit (GEO) satellite, based on which services are differentiated.

At 812, the mobile device configures the streaming application to stream data at a second bit rate in accordance with the available network resource. The second bit rate is lower than the first bit rate. The second bit rate is used while the mobile device is connected to the non-terrestrial communication network. For example, the streaming application is prevented from streaming 4K video while the mobile device is connected to the non-terrestrial communication network. In some implementations, the mobile device monitors the available network resources of the non-terrestrial communication network while the mobile device is connected to the non-terrestrial communication network. The second bit rate can be adjusted based on a change in the available network resources. For example, if the latency provided by the non-terrestrial communication network decreases, the second bit rate can be increased.

In some implementations, the streaming application is configured in accordance with a QoS provided by the non-terrestrial communication network, as described in more detail with reference to FIG. 7. The QoS can be based on a frequency range of the non-terrestrial communication network, a congestion level of the non-terrestrial communication network, and/or a signal strength of the non-terrestrial communication network. The network information can include a RAT type of the non-terrestrial communication network, and the streaming application can be configured in accordance with the RAT type. In some embodiments, the streaming application is configured in accordance with an APN associated with the streaming application while the mobile device is connected to the satellite network. The APN can block particular applications and services from accessing the satellite network while the mobile device is connected to the satellite network, and allow only certain applications to access the satellite network.

In some implementations, in accordance with the available network resource, a messaging application installed on the mobile device is prevented from sending rich text messages, emojis, audio, and/or video to avoid straining network resources while the mobile device is connected to the non-terrestrial communication network. In some embodiments, An application installed on the mobile device determines that the mobile device switched from the non-terrestrial communication network to a satellite network different from the non-terrestrial communication network. For example, the non-terrestrial communication network has a first link quality, and the satellite network has a second link quality different from the first link quality, as described in more detail with reference to FIG. 7. In accordance with the second link quality, the streaming application is configured to stream data at a third bit rate different from the second bit rate while the mobile device is connected to the satellite network.

Figure 9:
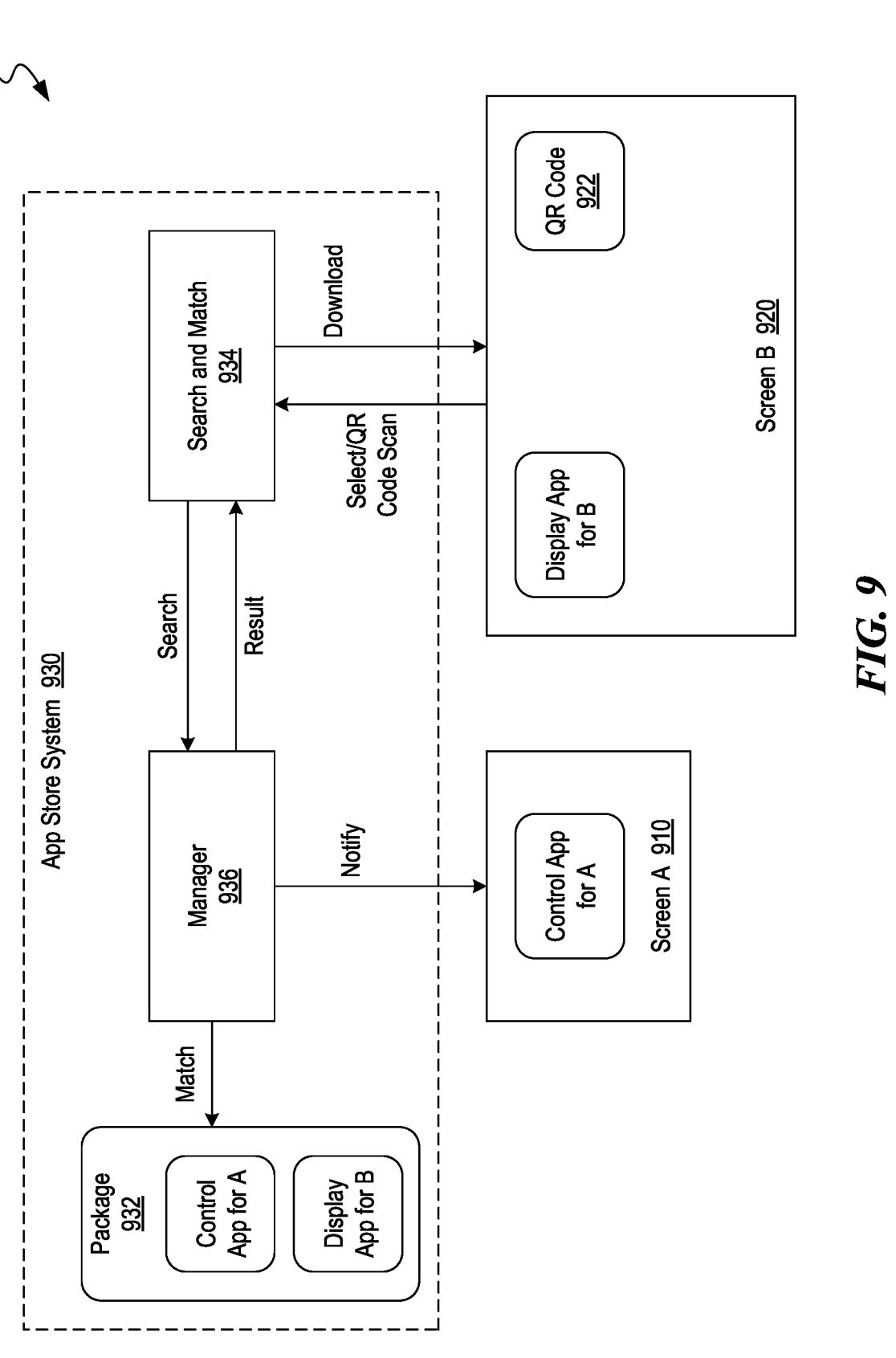
FIG. 9 is a block diagram that illustrates an example application distribution system in accordance with aspects of the present technology.

FIG. 9 is a block diagram that illustrates an example application distribution system 900 in accordance with aspects of the present technology. The application distribution system 900 is implemented using components of the example computer system 1100 illustrated and described in more detail with reference to FIG. 11. For example, the application distribution system 900 can be implemented using processor 1102 and instructions 1108 programmed in the memory 1106 illustrated and described in more detail with reference to FIG. 11. Likewise, implementations of the application distribution system 900 can include different and/or additional components or be connected in different ways.

The application distribution system 900 is a network system including user devices 910, 920 and an app store system 930 remotely coupled to the user devices. The user devices 910, 920 can be any applicable type of electronic devices for consumer use. Examples of user devices include, but are not limited to, smartphones, tablets, televisions, projectors, smart watches, smart glasses (e.g., GOOGLE GLASS®), wearable gadgets (e.g. smart wristband, t-shirts, necklaces, or shoes), media (e.g., music and/or video) players, game players, game consoles and controllers, electronic book (e-book) readers, cloud terminals, and in-car media systems. The user devices 910, 920 can be wearable devices (e.g., smart watches or smart glasses) or non-wearable devices (e.g., televisions or tablets). The user devices 910, 920 can have any suitable operating system (OS), such as ANDROID®, IOS®, WINDOWS®, LINUX®, or UNIX®. Since user devices 710, 720 have displays or screens as interfaces for communication with users, the user devices disclosed herein are sometimes be referred to simply as screens. As shown by FIG. 9, screen A and screen B refer to the user devices 910 and 920, respectively.

The app store system described herein refers to one or more network servers providing application services to its customers or users. For example, the app store system 930 can be the server end of a mobile application store such as the APPLE® App Store, GOOGLE PLAY®, AMAZON@ App Store, or any other application store, or combinations of multiple app stores. The app store system 930 can also be another entity managing one or more app stores, but may or may not host apps itself. The app store system can sometimes be referred to herein in short as an "app store." The app store system 930 can be connected to the user devices 910, 920 via any suitable type of network, e.g., via 5G, 6G, a wired/wireless Internet connection, or a satellite network as illustrated and described in more detail with reference to FIGS. 5A and 7. The user devices 910, 920 may have dedicated apps or software (e.g., GOOGLE PLAY® App and AppStore App) installed thereon to communicate with the app store system 930.

The app store system 930 includes functional modules or units configured to provide application services to users of the app store system 930. In embodiments, the app store system 930 manages a package 932 that contains a set of related apps having pre-defined relationships. The package 932 includes bundled applications, such as multiple related apps or different versions of the same app. The app store system 930 can host or store the apps, or call the apps from a separate app store. Depending on the apps, the relationships in the package 932 can include a play-control relationship, a control-display relationship, a full version-mini version relationship, a hooking relationship, different versions of the same app (depending on device types or operating systems), or combinations thereof.

As used herein, apps in a package refer to different apps associated with one another or different versions of the same app. For example, the package 932 includes a control app while the user devices 910, 920 are connected to a terrestrial network and a display app while the user devices 910, 920 are connected to a satellite network. An example terrestrial network 721 and example satellite network 722 are illustrated and described in more detail with reference to FIG. 7. The control app can be GOOGLE CHROMECAST®, and the display app can be GOOGLE YOUTUBE®. Alternatively, the control app can be a game controller, and the display app can be a game display app. In embodiments, related apps in the package 932 can be integrative parts providing a certain service (e.g., a health service app can have a first version to perform setting and other functions on a terrestrial network, and a second version to track and collect data and provide simple statistics on a satellite network). Versions can include enhancement of user experience on a terrestrial network (e.g., CHROMECAST® allows a user to watch YOUTUBE® on a big screen high definition television (HDTV) rather than a small smartphone). In examples, the package 932 includes a first version of the ANGRY BIRD™ App for terrestrial networks and a second version of the ANGRY BIRD™ App for satellite networks. In this case, each version of the same app can be designed or tailored to fit the characteristics of different networks (e.g., ANGRY BIRD™ for terrestrial networks can require higher image definition than on satellite networks).

In some implementations, the package 932 comprises a first app and one or more related app versions. In use, user device 910 sends a request to the app store system 930 to download the first app, and the app store pushes the first app to be downloaded to the user device 910. After a user downloads the first app from the app store system 930 and installs the first app on the user device 910, the app store system 930 may search for related app versions and match them to the first app, e.g., by using a search and match module 934. The search and match may be implemented in various ways. In a first example, after installing the first app, the user may initiate the search by sending a request to the app store system 930 to match one or more app versions to the first app. Upon receiving the request, a management module or manager 936 in the app store system 930 may identify the package 932. After identifying the package 932, the manager 936 may notify the user device 910 of the related apps. The user may decide whether to install the related app versions on the user device 910 or on other devices such as the user device 920.

In other embodiments, the app store may directly push the related app versions to be installed in the user device 910. The user may scan a quick response (QR) code 922 displayed on the user device 920, and send the QR code to the app store to facilitate the download process. In some examples, when the first app is requested by the user device 910, the app store system 930 may automatically (i.e., without needing any additional request from the user device 910) determine that the first app is part of the package 932. The app store system 930 may offer the package 932 for sale to the user as a bundle at a discount price, or provide the related apps in the package 932 as gift for promotion purposes. The user may give consent to purchase the package 932, e.g., by indicating to the app store system 930 that they wish to install the package 932. The app store system 930 may push apps of the package 932 to be downloaded onto a user device. Alternatively, after the user purchases the first app, the app store system 930 may give the user an option whether to purchase any additional related app. Upon approval of the user, the app store system 930 may push related apps to be downloaded and installed on one or more user devices.

Related app versions in the package 932 can use individual licenses or may share a common license. Licensing between the related app versions can be viewed as one of the relationships in the package 932, and such a relationship may be defined by the app store system 930 or app developers. A license may be granted by the app store system 930 upon completion of purchase or download, and may be valid for any suitable period of time.

Apps for any suitable type of content, such as video, audio, image, other media, and e-book can be implemented using the embodiments disclosed herein. For example, a first version of an app can allow video content having high definition for television viewing, while a second version of the same app may only allow video having low definition for smartphone viewing on a satellite network. Further, an audio portion of video content can be extracted and played on a smart watch on a satellite network.

In some implementations, the application distribution system 900 includes or can interface with two different mobile app stores. Each of the two different mobile app stores is similar to the app store system 930. For example, the manager 936 or another entity of the application distribution system 900 receives an access request for access to a first mobile app store from the user device 910 while the user device 910 is connected to a non-terrestrial communication network. An example non-terrestrial communication network 722 is illustrated and described in more detail with reference to FIG. 7. The first mobile app store includes multiple first versions of applications configured for use on terrestrial networks.

In response to receiving the access request, the application distribution system 900 causes display of a second mobile app store on an electronic display (Screen A) of the user device 910. The second mobile app store (sometimes referred to as a shadow app store) includes multiple second versions of the same applications, but configured for use on non-terrestrial networks. For example, a first versions of an app is configured to stream at a first bit rate while the user device 910 is connected to a terrestrial communication network. A corresponding second version of the app is configured to stream at a second bit rate lower than the first bit rate while the user device 910 is connected to a non-terrestrial communication network. The different versions of an app can look and feel different. For example, the color(s) and text displayed in a graphical user interface (GUI) of a first version of an app in the first mobile app store can be different than the color(s) and text displayed in a GUI of a corresponding second version of the app in the second mobile app store. In some implementations, at least one feature is disabled in the one of the multiple second versions, and the feature is enabled in a corresponding one of the multiple first versions.

The application distribution system 900 receives a download request from the mobile device for downloading one of the multiple second versions (i.e., a version of an app from the second mobile app store). In response to receiving the download request, the application distribution system 900 pushes the one of the multiple second versions to the user device 910 for installation on the user device 910 while the user device 910 is connected to the non-terrestrial communication network. In some implementations, a corresponding first version of an app is bundled with a second version of the app into a package. The application distribution system 900 can push the package to the user device 910 for installation on the user device 910 (e.g., when the application distribution system 900 pushes the one of the multiple second versions to the user device 910). The first version of the app would be visible on the user device 910 while the user device 910 is connected to a terrestrial communication network. In some implementations, the application distribution system 900 determines that the user device 910 has switched from the non-terrestrial network to a terrestrial network. The application distribution system 900 knows that the user downloaded the one of the multiple second versions, and sends a message to the mobile device that a corresponding one of the multiple first versions is available for download.

In some implementations, while the user device 910 is connected to a non-terrestrial communication network, the application distribution system 900 determines that an application of the multiple first versions is already installed on the user device 910. The application distribution system 900 sends a message to the mobile device that a corresponding application in the second mobile app store is available for download.

In some implementations, a mobile app store (e.g., app store system 930) includes multiple first versions of apps configured for use on terrestrial networks. The multiple first versions are bundled with multiple second versions of the same apps configured for use on non-terrestrial networks into packages (e.g., package 932). When the app store system 930 receives a request from user device 910 for downloading an app in the package 932, the app store system 930 pushes the package 932 to the user device 910 for installation on the user device 910. The package includes a first version of the app bundled with a second version of the app. The first version of the app is displayed on an electronic display (Screen A) of the user device 910 for use while the user device 910 is connected to a terrestrial network. The second version of the app is displayed on the user device 910 for access by the user while the user device 910 is connected to a non-terrestrial network.

In some implementations, at least one feature is disabled in the second version, while the feature is enabled in the first version. The first version can be configured to stream at a first bit rate, while the second version is configured to stream at a second bit rate lower than the first bit rate. A graphical user interface (GUI) of the first version can include at least a first color and/or text, while a GUI of the second version includes at least a second color and/or text different from the first color and/or text. In some embodiments, the second version is configured to prevent sending of rich text messages, emojis, audio, and/or video while the user device 910 is connected to a non-terrestrial network. The second version can be configured to adjust a bit rate of data streamed by the second version based on a radio access technology (RAT) type of the non-terrestrial communication network.

Figure 10:
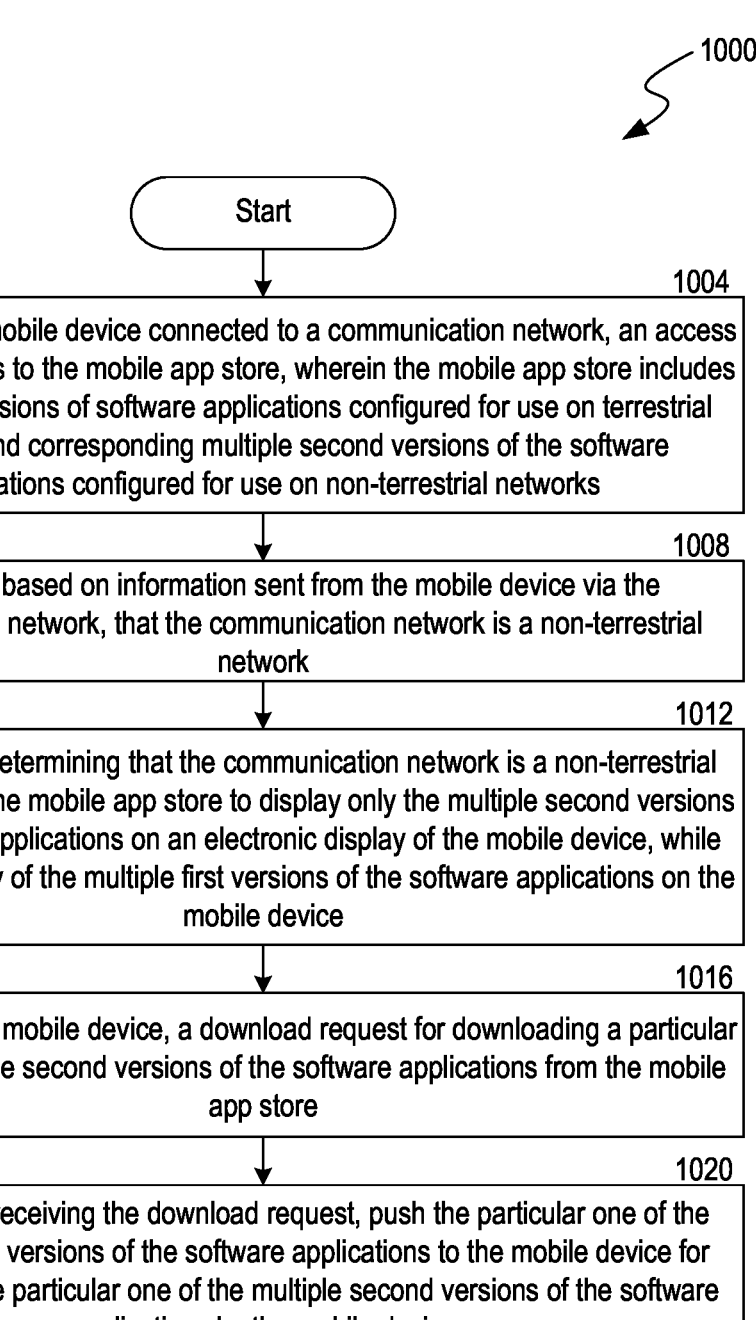
FIG. 10 is a flow diagram that illustrates an example process in accordance with aspects of the present technology.

FIG. 10 is a flow diagram that illustrates an example process 1000 in accordance with aspects of the present technology. In some implementations, the process is performed by the system 900 illustrated and described in more detail with reference to FIG. 9. In some implementations, the process is performed by a computer system, e.g., example computer system 1100 illustrated and described in more detail with reference to FIG. 11. Particular entities, for example, user device 910 or app store system 930, perform some or all of the steps of the process in other implementations. The user device 910 is illustrated and described in more detail with reference to FIG. 9. Likewise, implementations can include different and/or additional steps or can perform the steps in different orders.

At 1004, the app store system 930 receives an access request for access to the an access request for access to the mobile app store from a mobile device (e.g., user device 910) connected to a communication network. The app store system 930 includes multiple first versions of software applications configured for use on terrestrial networks, and corresponding multiple second versions of the software applications configured for use on non-terrestrial networks. An example terrestrial network 721 and an example non-terrestrial network 722 are illustrated and described in more detail with reference to FIG. 7. In some embodiments, at least one feature is disabled in the one of the multiple second versions of the software applications, and the feature is enabled in a corresponding one of the multiple first versions of the software applications.

In some implementations, a first version of a software application (corresponding to a second version of the software application) is configured to stream at a first bit rate while the mobile device is connected to a terrestrial communication network. The second version of the software application is configured to stream at a second bit rate lower than the first bit rate while the mobile device is connected to the non-terrestrial communication network. Use of a second version of a software application reduces greenhouse gas emissions compared to use of a corresponding first version of the software application because of reduced electrical power consumption by the mobile device and a reduced amount of data stored, downloaded, and transported.

At 1008, the app store system 930 determines that the communication network is a non-terrestrial network based on information obtained from the communication network. The information can include a RAT type, a PLMN code, etc. The information can be sent by the mobile device, the communication network itself, or another entity connected to the communication network. In some embodiments, the app store system 930 determines that an application of the multiple first versions of the software applications is installed on the mobile device. The app store system 930 can send a message to the mobile device that a corresponding application of the multiple second versions of the software applications is available for download.

At 1012, in response to determining that the communication network is a non-terrestrial network, the app store system 930 is enabled to display the multiple second versions of the software applications on an electronic display (e.g., Screen A of FIG. 9) of the mobile device. Display of the multiple first versions of the software applications on the mobile device is prevented, such that only the multiple second versions of the software applications are visible and accessible to a user.

At 1016, the app store system 930 receives a download request from the mobile device for downloading one of the multiple second versions of the software applications from the app store system 930.

At 1020, in response to receiving the download request, app store system 930 pushes the one of the multiple second versions of the software applications to the mobile device for installation of the one of the multiple second versions of the software applications by the mobile device. At some point, app store system 930 can determine that the mobile device switched from the non-terrestrial network to a terrestrial network. In response, app store system 930 identifies a particular one of the multiple first versions of the software applications that corresponds to the particular one of the multiple second versions of the software applications for download by the mobile device. For example, app store system 930 can determine that the mobile device switched from the non-terrestrial network to a terrestrial network. In response, app store system 930 can send a message to the mobile device that a particular one of the multiple first versions of the software applications that corresponds to the particular one of the multiple second versions of the software applications is available for download.

Computer System

Figure 11:
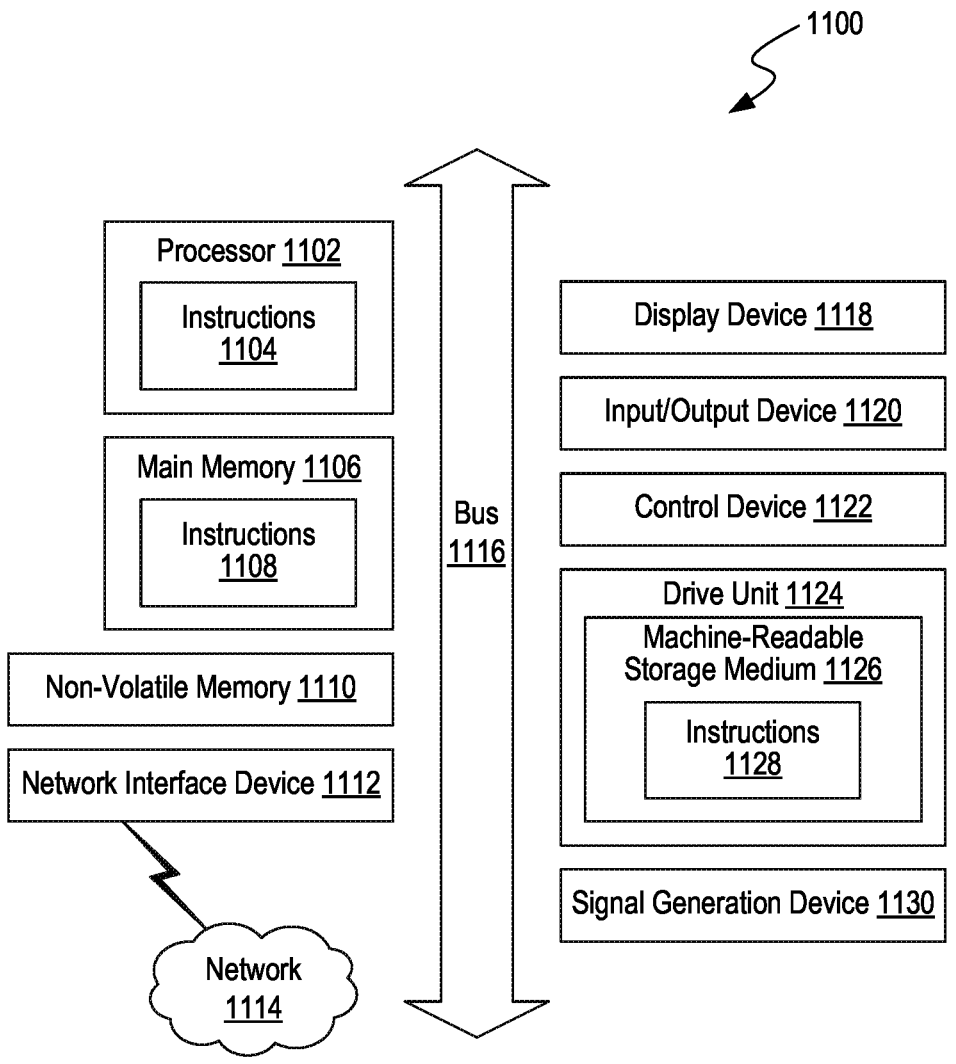
FIG. 11 is a block diagram that illustrates an example of a computer system in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, video display device 1118, an input/output device 1120, a control device 1122 (e.g., keyboard and pointing device), a drive unit 1124 that includes a storage medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 11 for brevity. Instead, the computer system 1100 is intended to illustrate a hardware device on which components illustrated or described relative to the examples of the figures and any other components described in this specification can be implemented.

The computer system 1100 can take any suitable physical form. For example, the computer system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1100. In some implementations, the computer system 1100 is an embedded computer system, a system-on-chip (SOC), a single-board computer system (SBC) or a distributed system such as a mesh of computer systems or include one or more cloud components in one or more networks. Where appropriate, one or more computer systems 1100 can perform operations in real-time, near real-time, or in batch mode.

The network interface device 1112 enables the computer system 1100 to mediate data in a network 1114 with an entity that is external to the computer system 1100 through any communication protocol supported by the computer system 1100 and the external entity. Examples of the network interface device 1112 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable (storage) medium 1126 can include any medium that is capable of storing, encoding, or carrying a set of instructions for execution by the computer system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computer system 1100 to perform operations to execute elements involving the various aspects of the disclosure.

REMARKS

The terms "example," "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the embodiments. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the embodiments, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the embodiments disclosed herein should not be taken to imply that the terminology is being redefined herein to be restricted to any specific characteristics, features, or aspects of the embodiments disclosed herein with which that terminology is associated. In general, the terms used in the following examples should not be construed to limit the embodiments disclosed herein to the specific examples disclosed herein, unless the above Detailed Description explicitly defines such terms. Accordingly, the actual scope of the embodiments disclosed herein encompasses not only the disclosed examples, but also all equivalent ways of practicing or implementing the embodiments disclosed herein under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the embodiments disclosed herein can be modified to employ the systems, functions, and concepts of the various references described above to provide yet further implementations of the embodiments disclosed herein.

To reduce the number of claims, certain implementations are presented below in certain forms, but the applicant contemplates various aspects of the embodiments disclosed herein in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A mobile device comprising:
at least one hardware processor; and
at least one non-transitory computer-readable storage medium storing instructions, which, when executed by the at least one hardware processor, cause the mobile device to:
determine that a first communication network associated with a mobile network operator of the mobile device is unavailable,
wherein multiple software applications are installed on the mobile device;
receive network information from a second communication network, wherein the network information indicates that the second communication network is available;

in response to determining that the second communication network is available, connect to the second communication network;

determine, based on the network information, that the second communication network is a non-terrestrial communication network, wherein the second communication network is associated with a bandwidth less than a threshold bandwidth; and in response to determining that the second communication network is a non-terrestrial communication network:

configure the mobile device to operate in a non-terrestrial mode; and render at least one of the multiple software applications inoperable while the mobile device is operating in the non-terrestrial mode, wherein the at least one of the multiple software applications requires at least the threshold bandwidth to operate.

2. The mobile device of claim 1, wherein the instructions cause the mobile device to:

remove the at least one of the multiple software applications from an electronic display of the mobile device.

3. The mobile device of claim 1, wherein the instructions cause the mobile device to:

terminate background operation of the at least one of the multiple software applications on the mobile device.

4. The mobile device of claim 1, wherein the instructions cause the mobile device to:

grey out the at least one of the multiple software applications on an electronic display of the mobile device to render the at least one of the multiple software applications inaccessible by a user of the mobile device.

5. The mobile device of claim 1, wherein the bandwidth is a second bandwidth, and wherein the first communication network is associated with a first bandwidth greater than the second bandwidth.

6. The mobile device of claim 1, wherein the instructions cause the mobile device to:

determine that a user of the mobile device previously indicated that the at least one of the multiple software applications is to be disabled while the mobile device is connected to a network providing less than the threshold bandwidth.

7. The mobile device of claim 1, wherein the instructions cause the mobile device to:

determine that a user of the mobile device previously indicated that the at least one of the multiple software applications is to be disabled while the mobile device is connected to a satellite network.

8. At least one non-transitory computer-readable storage medium storing instructions, which, when executed by at least one data processor of a mobile device, cause the mobile device to:

receive network information from a communication network, wherein the network information indicates that the communication network is available;

in response to determining that the communication network is available, connect to the communication network;

determine, based on the network information, that the communication network is a non-terrestrial communication network; and in response to determining that the communication network is a non-terrestrial communication network:

render at least one software application installed on the mobile device inoperable while the mobile device is connected to the non-terrestrial communication network, wherein the non-terrestrial communication network is associated with less than a threshold bandwidth, and wherein the at least one software application requires at least the threshold bandwidth to operate.

9. The non-transitory computer-readable storage medium of claim 8, wherein the instructions cause the mobile device to:

disable a feature of another application installed on the mobile device to render the feature inoperable while the mobile device is connected to the non-terrestrial communication network.

10. The non-transitory computer-readable storage medium of claim 8, wherein the instructions cause the mobile device to:

grey out a feature of another application installed on the mobile device to render the feature inaccessible by a user of the mobile device while the mobile device is connected to the non-terrestrial communication network.

11. The non-transitory computer-readable storage medium of claim 8, wherein the instructions cause the mobile device to:

render the at least one software application inoperable based on device configuration data of the mobile device.

12. The non-transitory computer-readable storage medium of claim 8, wherein rendering the at least one software application inoperable prevents the mobile device from accessing data services.

13. The non-transitory computer-readable storage medium of claim 8, wherein rendering the at least one software application inoperable while the mobile device is connected to the non-terrestrial communication network reduces greenhouse gas emissions compared to operating the at least one software application while the mobile device is connected to the non-terrestrial communication network.

14. A computer-implemented method comprising:

receiving network information from a communication network, wherein the network information indicates that the communication network is available;

in response to determining that the communication network is available, connecting to the communication network;

determining, based on the network information, that the communication network is a non-terrestrial communication network; and in response to determining that the communication network is a non-terrestrial communication network:

rendering at least one software application installed on the mobile device inoperable while the mobile device is connected to the non-terrestrial communication network, wherein the non-terrestrial communication network is associated with less than a threshold bandwidth, and wherein the at least one software application requires at least the threshold bandwidth to operate.

15. The method of claim 14, comprising:

disabling a feature of another application installed on the mobile device to render the feature inoperable while the mobile device is connected to the non-terrestrial communication network.

16. The method of claim 14, comprising:

greying out a feature of another application installed on the mobile device to render the feature inaccessible by a user of the mobile device while the mobile device is connected to the non-terrestrial communication network.

17. The method of claim 14, comprising:

rendering the at least one software application inoperable based on device configuration data of the mobile device.

18. The method of claim 14, wherein rendering the at least one software application inoperable prevents the mobile device from accessing data services.

\* \* \* \* \*